US012149036B2

(12) United States Patent
Takeuchi et al.

(10) Patent No.: US 12,149,036 B2
(45) Date of Patent: Nov. 19, 2024

(54) TERMINAL AND TERMINAL WIRE ASSEMBLY

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); TOYOTA JIDOSHA KABUSHIKI KAISHA, Toyota (JP)

(72) Inventors: Shunya Takeuchi, Yokkaichi (JP); Masaaki Tabata, Yokkaichi (JP); Nungna Wi, Yokkaichi (JP); Hajime Matsui, Yokkaichi (JP); Teruo Hara, Yokkaichi (JP); Keisuke Teramoto, Yokkaichi (JP); Hideki Matsunaga, Yokkaichi (JP); Hiroshi Kobayashi, Okazaki (JP); Takeshi Amakawa, Toyota (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 472 days.

(21) Appl. No.: 17/613,777

(22) PCT Filed: Jun. 4, 2020

(86) PCT No.: PCT/JP2020/022136
§ 371 (c)(1),
(2) Date: Nov. 23, 2021

(87) PCT Pub. No.: WO2020/250800
PCT Pub. Date: Dec. 17, 2020

(65) Prior Publication Data

US 2022/0231434 A1 Jul. 21, 2022

(30) Foreign Application Priority Data

Jun. 12, 2019 (JP) ................................ 2019-109706
Aug. 28, 2019 (JP) ................................ 2019-155819

(51) Int. Cl.
*H01R 4/50* (2006.01)
*H01R 43/16* (2006.01)

(52) U.S. Cl.
CPC ............... *H01R 4/50* (2013.01); *H01R 43/16* (2013.01)

(58) Field of Classification Search
CPC .......... H01R 4/50; H01R 4/48; H01R 4/5041; H01R 4/505; H01R 4/5083; H01R 43/16;
(Continued)

(56) References Cited

U.S. PATENT DOCUMENTS 2,959,766 A * 11/1960 Jacobsen ............. H01R 4/5016 439/863
4,597,622 A * 7/1986 Coe ........................ H01R 11/18 439/421
(Continued)

FOREIGN PATENT DOCUMENTS

CN 111684663 A 9/2020
DE 202016104726 U1 8/2017
(Continued)

OTHER PUBLICATIONS

Translated abstract of JP2009123622A (Year: 2009).*
Jul. 28, 2020 International Search Report issued in International Patent Application No. PCT/JP2020/022136.

*Primary Examiner* — Peter G Leigh
*Assistant Examiner* — Amara Anderson
(74) *Attorney, Agent, or Firm* — Oliff PLC

(57) ABSTRACT

A terminal coupled to an end of an electric wire on a front side with respect to an extending direction in which the electric wire extends. The terminal includes a terminal body including a holding section holding the electric wire and a slider slidable relative to the terminal body in the extending direction. The slider includes a pressing portion that presses the holding section toward the electric wire. The terminal body is formed from a folded metal sheet. The holding
(Continued)

section includes a holding protrusion that protrudes toward the electric wire and contacts the electric wire. The holding protrusion is formed from a folded metal sheet.

12 Claims, 20 Drawing Sheets

(58) Field of Classification Search
CPC ........ H01R 43/18; H01R 43/20; H01R 43/26; H01R 43/28; H01R 13/11; H01R 13/14
USPC .......................................................... 439/775
See application file for complete search history.

(56) References Cited

U.S. PATENT DOCUMENTS

| | | | | |
|---|---|---|---|---|
| 5,489,225 | A | | 2/1996 | Julian |
| 6,142,838 | A | | 11/2000 | Shinchi |
| 7,084,346 | B2 | * | 8/2006 | Pabst ..................... H01R 12/59 219/56.22 |
| 7,306,495 | B2 | | 12/2007 | Hashimoto et al. |
| 7,901,257 | B2 | | 3/2011 | Okamura et al. |
| 2005/0026515 | A1 | | 2/2005 | Hashimoto et al. |
| 2010/0035485 | A1 | | 2/2010 | Okamura et al. |
| 2021/0234286 | A1 | | 7/2021 | Miyamura et al. |

FOREIGN PATENT DOCUMENTS

| | | | | |
|---|---|---|---|---|
| JP | 15-000085 | Y1 | | 1/1940 |
| JP | H10-199581 | A | | 7/1998 |
| JP | 2005-050736 | A | | 2/2005 |
| JP | 2009123622 | A | * | 6/2009 |
| JP | 2010-073348 | A | | 4/2010 |
| JP | 2015-056209 | A | | 3/2015 |

* cited by examiner

TERMINAL AND TERMINAL WIRE ASSEMBLY

TECHNICAL FIELD

The present disclosure relates to a terminal and a terminal wire assembly.

BACKGROUND ART

A known terminal wire assembly includes a core wire exposed at an end of the electric wire and a terminal coupled to the core wire. The terminal may include a crimping portion that is crimped on a section of the core wire that is exposed at the end of the electric wire.

To crimp the terminal on the core wire, the following steps may be performed. A sheet metal is pressed into a predefined shape to prepare the terminal. The terminal is placed on a lower die of dies that are movable relative to each other in the vertical direction. The section of the core wire exposed at the end of the electric wire is placed on the crimping portion of the terminal. The one of the dies or both dies are moved closer to each other. The crimping portion of the terminal is crimped on the section of the core wire by pressing the crimping portion of the terminal with a crimping portion of the upper die and a placing portion of the lower die. Through these steps, the terminal is coupled to the end section of the electric wire (see Patent Document 1).

RELATED ART DOCUMENT

Patent Document

[Patent Document 1]
Japanese Unexamined Patent Application Publication No. 2005-50736

SUMMARY OF THE INVENTION

Problem to be Solved by the Invention

According to the technology described above, relatively large equipment including dies and a jig is required to crimp the crimping the crimping portion of the terminal onto the core wire of the electric wire. Therefore, equipment investment may be required, which may result in an increase in production cost.

To resolve the above problem, the following terminal may be considered. The terminal includes a terminal body and a slider. The terminal body includes a holding section that is deformable in an extending direction in which the electric wire extends. The slider is slidable relative to the terminal body in the extending direction. The slider includes a pressing portion that presses the holding section against the electric wire while the electric wire is held by the holding section.

To improve reliability in electric connection between the terminal and the electric wire, the holding section may include protrusions and recesses. With the protrusions and the recesses, the electric wire is properly held. However, it is not preferable that production cost increases due to formation of the protrusions and the recesses.

The technology described herein was made in view of the above circumstances. An object is to provide a terminal that is produced at low cost.

Means for Solving the Problem

A terminal described herein is coupled to an end of an electric wire on a front side with respect to an extending direction in which the electric wire extends. The terminal includes a terminal body and a slider. The terminal body includes a holding section that holds the electric wire. The slider is slidable relative to the terminal body in the extending direction. The slider includes a pressing portion that presses the holding section toward the electric wire. The terminal body is formed from a folded metal sheet. The holding section includes a holding protrusion that protrudes toward the electric wire and contacts the electric wire. The holding protrusion is formed from a folded metal sheet.

Advantageous Effects of Invention

According to the present disclosure, a production cost of the terminal is reduced.

MODES FOR CARRYING OUT THE INVENTION

Figure 1:
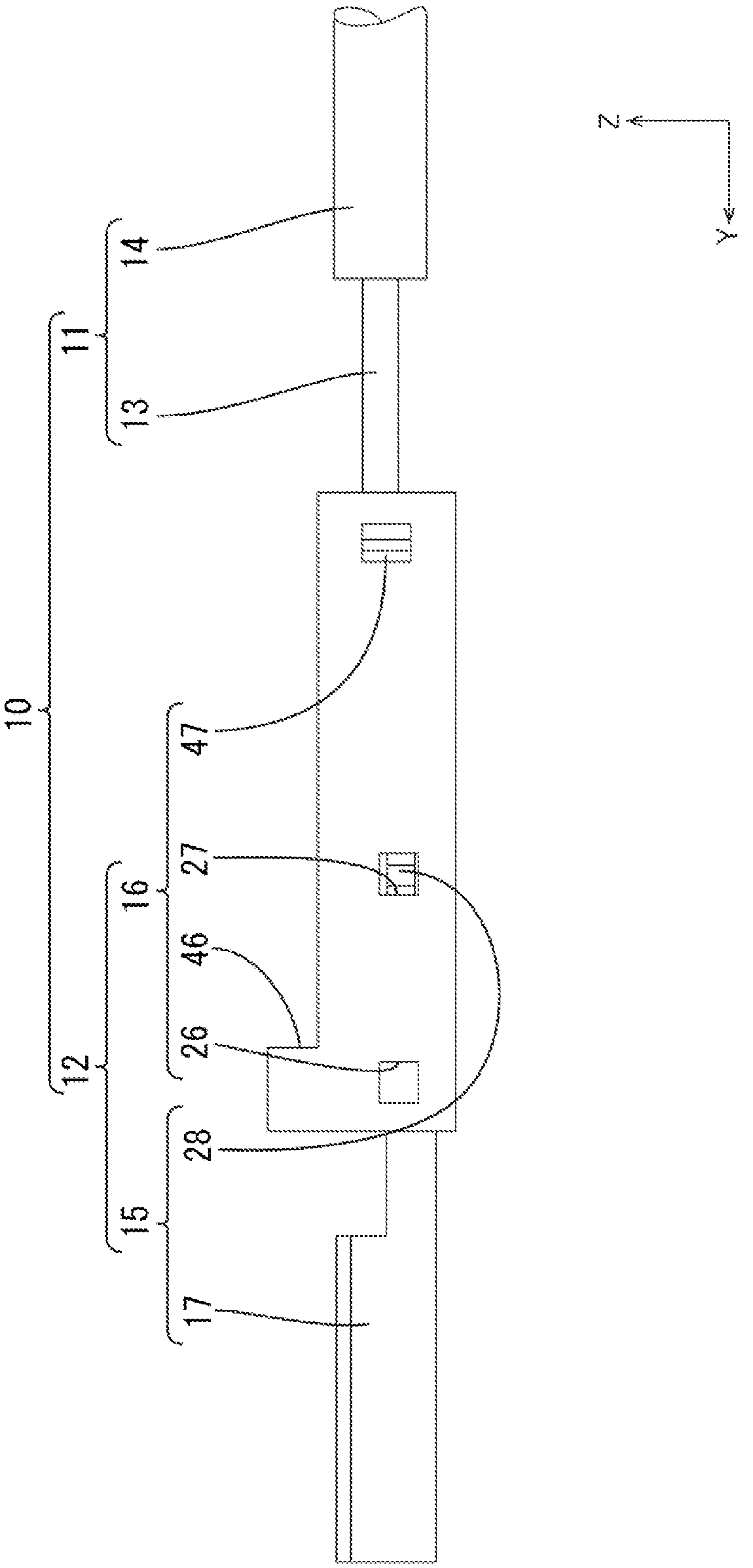
FIG. 1 is a side view of a terminal wire assembly according to a first embodiment.

Description of Embodiments According to the Present Disclosure

First, embodiments according to the present disclosure will be listed and described.

(1) The present disclosure relates to a terminal coupled to an end of an electric wire on a front side with respect to an extending direction in which the electric wire extends. The terminal includes a terminal body and a slider. The terminal body includes a holding section that holds the electric wire. The slider is slidable relative to the terminal boy in the extending direction. The slider includes a pressing portion that presses the holding section toward electric wire. The terminal body is formed from a folded metal sheet. The holding section includes a holding protrusion that protrudes toward the electric wire and contacts the electric wire. The holding protrusion is formed from a folded metal sheet.

Because the holding protrusion is formed from the folded metal sheet, a production cost of the terminal can be reduced in comparison to a holding protrusion that is prepared by hammering that is performed separately.

(2) The terminal body may include holding section. The holding sections may include holding protrusion. The holding protrusions included in the holding sections may be displaced from each other in the extending direction.

The electric wire sandwiched between the holding sections are held by the holding sections with the electric wire bent by the holding protrusions that are displaced from each other in the extending direction. The electric wire may be bent in a direction crossing the extending direction. Because the electric wire is bent, edges of the holding protrusions dig into the electric wire. According to the configuration, electrical connection between the electric wire and the terminal is properly established.

(3) The holding protrusion may be formed from the folded metal sheet folded at a side edge that extends in the extending direction.

The holding protrusion of the holding section may be formed by folding the meal sheet at a side edge that extends in a direction crossing the extending direction (e.g., a rear edge). If the electric wire is pulled rearward and the holding protrusion rubs against the electric wire, the holding protrusion may be turned over toward the rear. The holding protrusion described earlier is folded at the side edge of the holding section extending in the extending direction. Therefore, the holding protrusion is less likely to be turned over.

(4) The holding protrusion may be formed from the folded metal sheet folded at a side edge that extends in a direction crossing the extending direction.

The metal sheet that protrudes in the extending direction can be used for a coupling portion coupled to a carrier. Therefore, a yield improves in comparison to a configuration in which a coupling portion protrudes in a direction of the metal sheet crossing the extending direction.

(5) The holding protrusion may include a rear receiving section that protrudes from a rear end of the holding protrusion in the extending direction toward the electric wire.

When the electric wire is pulled rearward, the holding protrusion slides rearward along with the electric wire. The holding protrusion receives a force F toward the rear and the rear receiving section contacts the holding protrusion from the rear. According to the configuration, displacement of the holding protrusion toward the rear is restricted.

(6) The holding section may include a fragile section at one of side edges of the holding section to form a section that is narrowed in a direction crossing the extending direction.

With the fragile section at a predefined position at which the holding section is designed to bend, the holding section can be bent at the predefined position. Because the electric wire is properly held by the holding section, reliability in electric connection between the terminal and the electric wire increases.

(7) The fragile section may include a first fragile section at a first side edge of the holding section and a second fragile section at a second side edge of the holding section. The first fragile section and the second fragile section may be displaced from each other in the extending direction.

Because the first fragile section and the second fragile section are displaced from each other in the extending direction, the holding sections are less likely to warp in comparison to a configuration in which the first fragile section and the second fragile section are at the same position with respect to the extending direction. According to the configuration, the holding section does not easily warp due to vibrations or any other fact. Therefore, the holding section is less likely to warp at unintended timing.

(8) The terminal body may include a bending restricting section that contacts the holding section and restricts excessive bending of the holding section when the pressing portion presses the holding section.

Because the excessive bending of the holding section is restricted by the bending restricting section, the electric wire is held by the holding section with a proper pressure. According to the configuration, the reliability in electric connection between the terminal and the electric wire further increases.

(9) The terminal body may include a sidewall that projects from a side edge of the holding section. The sidewall may include a chamfered section that is sloped outward toward the rear in the extending direction.

During insertion of the electric wire into the terminal body, the electric wire is guided by the chamfered section from the rear to the inside of the terminal body in the extending direction. According to the configuration, work efficiency in connecting of the electric wire to the terminal improves.

(10) A terminal wire assembly according to any one of above (1) to (9) and an electric wire coupled to the terminal.

Detail of Embodiment According to the Present Disclosure

Embodiments according to the present disclosure will be described. The present invention is not limited to the embodiments. All modifications within and equivalent to the technical scope of the claimed invention may be included in the technical scope of the present invention.

First Embodiment

A first embodiment according to the present disclosure will be described with reference to FIGS. 1 to 9. A terminal wire assembly 10 according to this embodiment includes a terminal 12 and an electric wire 11 to which the terminal 12 is coupled. In the following description, it is considered that an Z arrow, a Y arrow, and an X arrow in the drawing point the upper side the front side, and the left side, respectively. Regarding components having the same configuration, some of the components may be indicated by reference signs and others may not be indicated by the reference signs.

Electric Wire 11

As illustrated in FIG. 1, the electric wire 11 includes a core wire 13 and an insulating sheath 14 that covers an outer surface of the core wire 13. The insulating sheath 14 is made of synthetic resin having insulating properties. At an end of the electric wire 11, the insulating sheath 14 is ripped and a section of the core wire 13 is exposed. The core wire 13 in this embodiment is a single core wire including only one metal wire. Alternatively, a twisted wire including multiple metal fine wires that are twisted together may be used for the core wire 13. The metal of which the metal wire is made may be selected from any kinds of meatal including copper, copper alloy, aluminum, and aluminum alloy where appropriate. The core wire 13 in this embodiment may be made of copper or copper alloy.

Terminal 12

As illustrated in FIG. 1, the terminal 12 includes a terminal body 15 and a slider 16. The terminal body 15 is made of metal. The slider 16 is slidable relative to the terminal body 15.

Terminal Body 15

The terminal body 15 is formed by pressing a metal sheet into a predetermined shape. The metal of which the terminal body 15 is made may be selected from any kinds of metal including aluminum, aluminum alloy, and stainless steel where appropriate. The terminal body 15 in this embodiment may be made of copper or copper alloy. Surfaces of the terminal body 15 may be plated. The plating metal may be selected from any kinds of metal such as tin, nickel, and silver where appropriate. The terminal body 15 in this embodiment is tin-plated.

Figure 2:
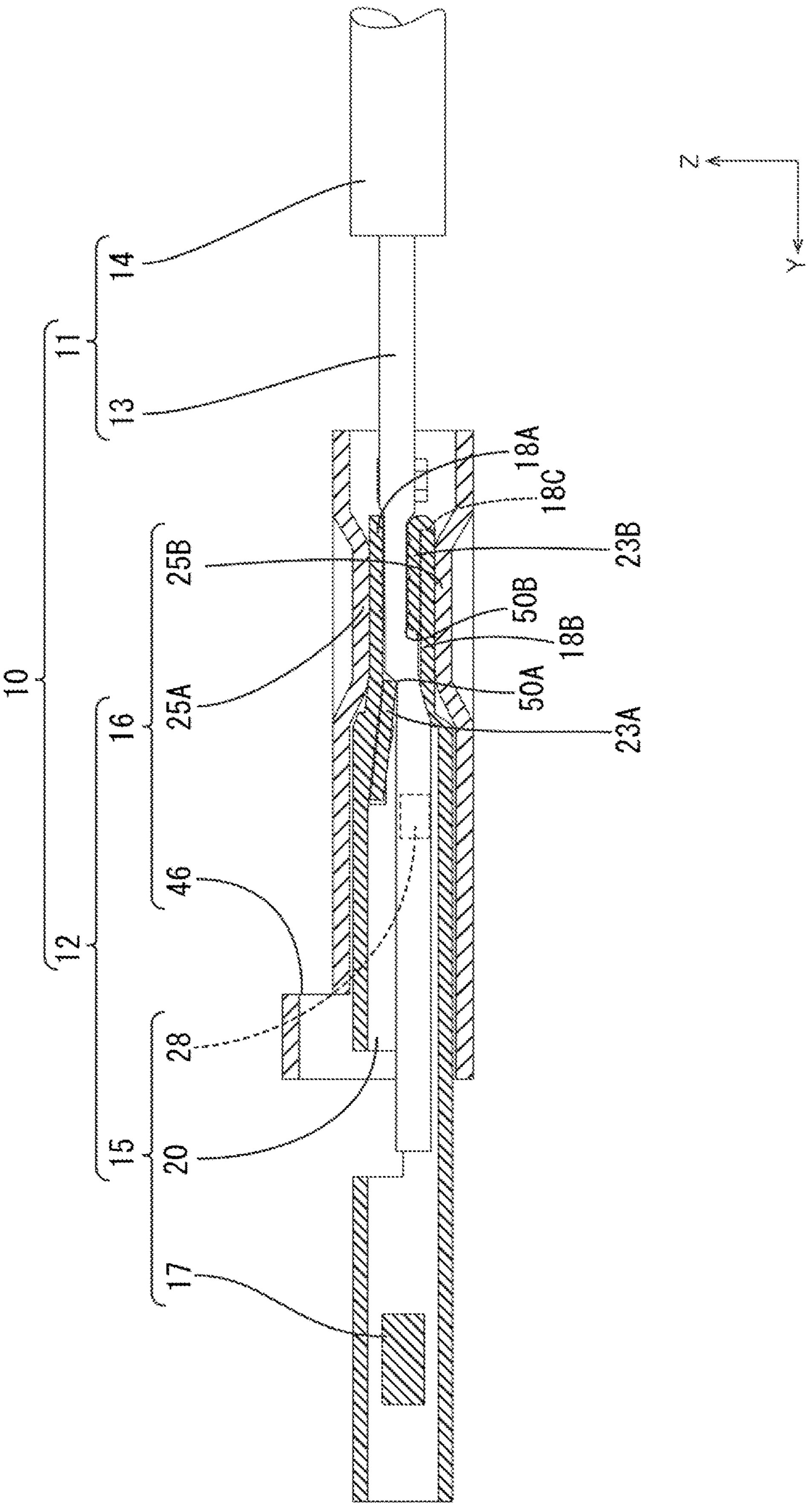
FIG. 2 is a side cross-sectional view of the terminal wire assembly.

As illustrated in FIG. 2, the terminal body 15 includes a tubular portion 17 and a wire coupling portion 20. A mating male terminal, which is not illustrated, is inserted into the tubular portion 17. The wire coupling portion 20 is behind the tubular portion 17 and coupled to the electric wire 11. The wire coupling portion 20 includes an upper holding section 18A and a lower holding section 18B that extend rearward.

As illustrated in FIG. 2, the tubular portion 17 has a rectangular tubular shape and extends in the front-rear direction. The tubular portion 17 has an opening through which the mating male terminal is inserted. An elastic contact tab, which is not illustrated, projects frontward from the rear section of the tubular portion 17 inside the tubular portion 17. When the mate terminal is inserted in the tubular portion 17 and elastic contact is established between the mate terminal and the elastic contact tab, the tubular portion 17 is electrically connected to the mate terminal.

Figure 3:
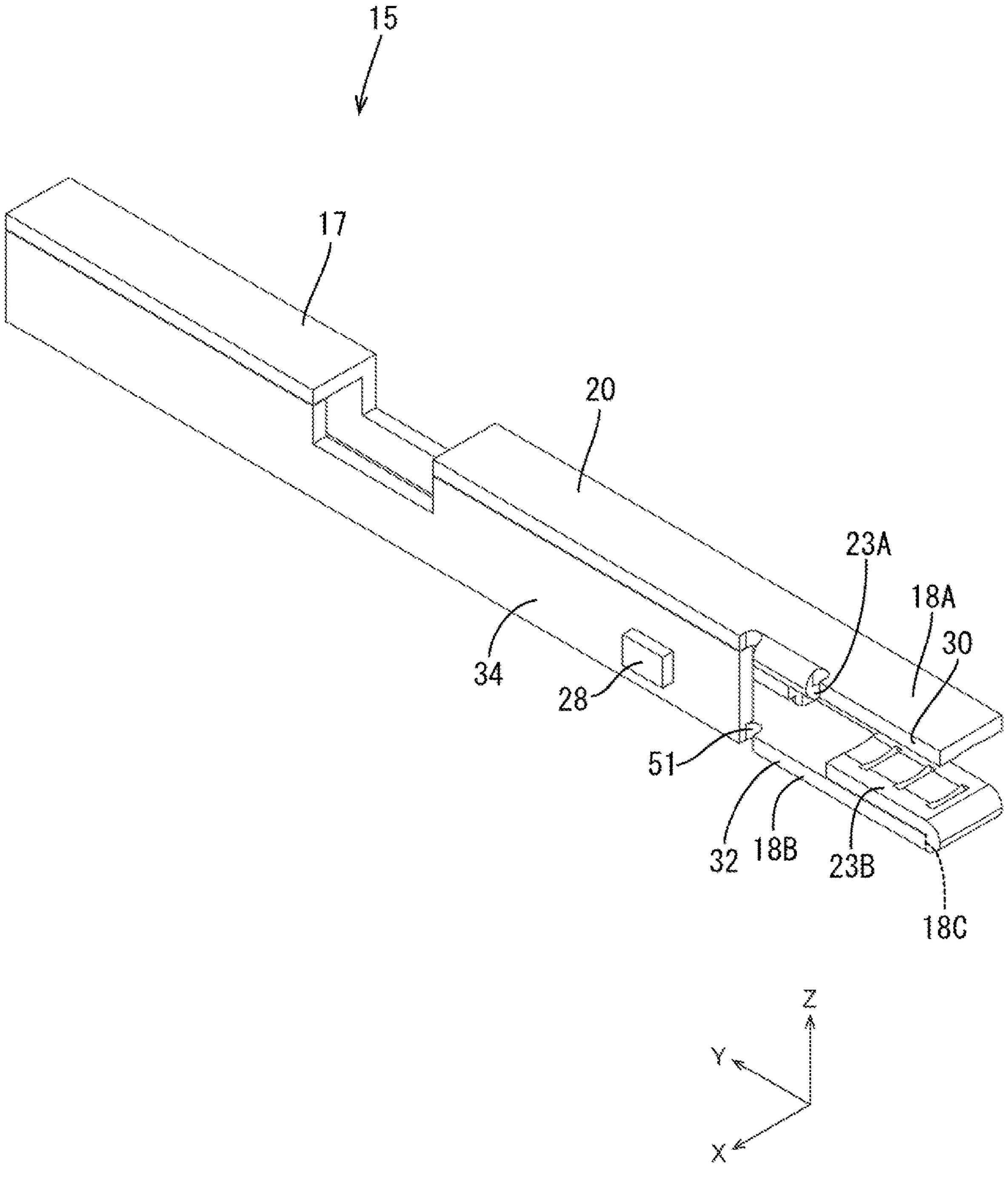
FIG. 3 is a perspective view of a terminal body.
Figure 4:
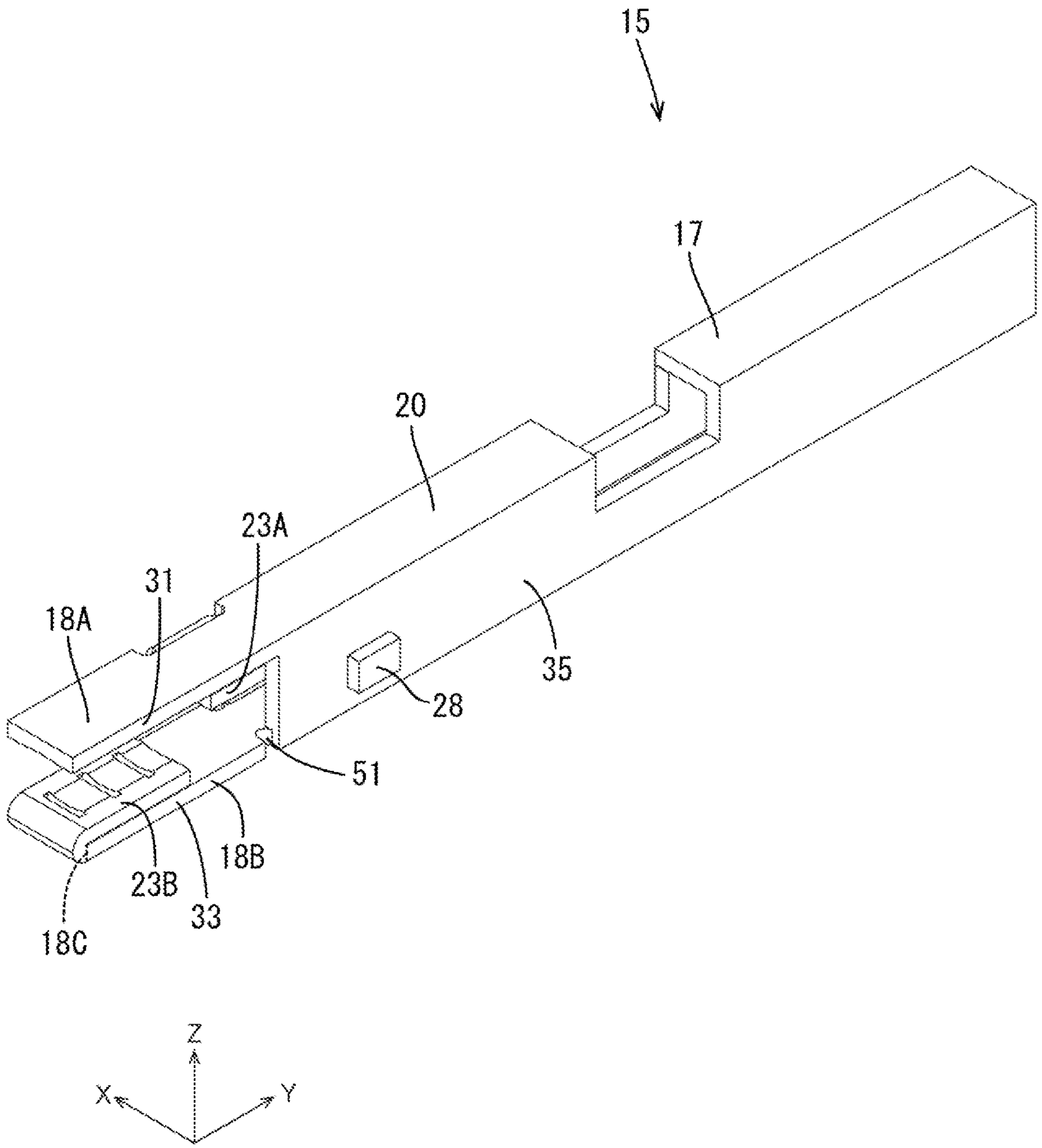
FIG. 4 is a perspective view of the terminal body.

As illustrated in FIG. 3, the wire coupling portion 20 is behind the tubular portion 17. The wire coupling portion 20 has a rectangular tubular shape. The upper holding section 18A (an example of a holding section) projects rearward from a rear end portion of an upper wall of the wire coupling portion 20. The lower holding section 18B projects rearward from a rear end portion of a lower wall of the wire coupling portion 20. The upper holding section 18A and the lower holding section 18B have elongated shapes extending in the front-rear direction. Lengths of the upper holding section 18A and the lower holding section 18B measuring in the front-rear direction are about equal to each other. The wire coupling portion 20 includes a left wall 34 that projects from a left edge 32 of the lower holding section 18B to a left edge 32 of the upper holding section 18A. Further, the wire coupling portion 20 includes a right wall 35 that projects from a right edge 33 of the lower holding section 18B to a right edge 31 of the upper holding section 18A.

As illustrated in FIG. 3, an upper holding protrusion 23A protrudes downward from a section of a lower surface of the upper holding section 18A in front of a rear edge of the upper holding section 18A. The upper holding protrusion 23A includes a section that projects from a left edge 30 of the upper holding section 18A is folded and in close contact with a lower surface of the upper holding section 18A. A right edge of the upper holding section 18A does not project rightward from a right edge of the upper holding section 18A.

As illustrated in FIG. 3, a lower holding protrusion 23B protrudes upward from a section of an upper surface of a rear edge of the lower holding section 18B. The lower holding protrusion 23B includes a section that projects from a rear edge of the lower holding section 18B is folded and in close contact with an upper surface of the lower holding section 18B. Namely, the lower holding protrusion 23B is formed by folding the metal sheet at a rear edge 18C of the lower holding section 18B (a side edge that crosses the extending direction in which the electric wire 11 extends). An area of the lower holding section 18B on which the lower holding protrusion 23B is placed is reinforced by the lower holding protrusion 23B and thus less likely to warp.

As illustrated in FIG. 2, the lower holding protrusion 23B is displaced from the upper holding protrusion 23A in the front-rear direction. A rear end of the upper holding protrusion 23A and a front end of the lower holding protrusion 23B are slightly separated from each other in the front-rear direction. A distance between the rear end of the upper holding protrusion 23A and the front end of the lower holding protrusion 23B is less than the diameter of the core wire 13. Therefore, an edge 50A of the rear end of the upper holding protrusion 23A and an edge 50B of the front end of the lower holding protrusion 23B dig into the core wire 13.

A lower surface of the upper holding section 18A and an upper surface of the lower holding section 18B dig into an oxide layer formed on the surface of the core wire 13 and locally strip the oxide layer so that the metal surface of the core wire 13 is exposed. With the metal surface contacting the upper holding section 18A and the lower holding section 18B, the core wire 13 is electrically connected to the terminal body 15.

A lower surface of the upper holding protrusion 23A and an upper surface of the lower holding protrusion 23B dig into the oxide layer formed on the surface of the core wire 13 and locally strip the oxide layer so that the metal surface of the core wire 13 is exposed. With the metal surface contacting the upper holding protrusion 23A and the lower holding protrusion 23B, the core wire 13 is electrically connected to the terminal body 15.

With the edge 50A of the rear end of the upper holding protrusion 23A and the edge 50B of the front end of the lower holding protrusion 23B digging into the core wire 13, the oxide film formed on the surface of the core wire 13 is removed. Therefore, the core wire 13 is more properly electrically connected to the terminal body 15.

A left fragile section 51 is formed in a front end of the lower holding section 18B. The left fragile section 51 is a notch that is recessed rightward from the left edge 32 of the lower holding section 18B (see FIG. 3). A right fragile section 52 is formed in the front end of the lower holding section 18B. The right fragile section 52 is a notch that is recessed leftward from a right edge 33 of the lower holding section 18B (see FIG. 4). The left fragile section 51 and the right fragile section 52 are at the same position with respect to the front-rear direction. An area of the lower holding section 18B in which the left fragile section 51 and the right fragile section 52 are formed is narrower in the right-left direction in comparison to other area of the lower holding section 18B. According to the configuration, the lower holding section 18B easily bends at the area in which the left fragile section 51 and the right fragile section 52 are formed.

Slider 16

As illustrated in FIG. 2, the slider 16 has a rectangular tube shape that extends in the front-rear direction. The slider 16 is formed into a predetermined shape with a known method including pressing, cutting, and casting. The metal of which the slider 16 is made may be selected from any kinds of metal including copper, copper alloy, aluminum, aluminum alloy, and stainless steel where appropriate. The slider 16 in this embodiment is made of stainless steel. Surfaces of the slider 16 may be plated. Metal used for plating may be selected from any kinds of metal including tin, nickel, and silver where appropriate.

As illustrated in FIG. 2, a front end of the upper wall of the slider 16 includes a jig contact section 46 that protrudes upward. A jig 45, which will be described later, contacts the jig contact section 46 from the rear (see FIG. 5).

As illustrated in FIG. 2, the rear section of the slider 16 includes an upper pressing portion 25A (an example of a pressing portion) that protrudes downward from a lower surface of the upper wall of the slider 16. The slider 16 includes a lower pressing portion 25B (an example of a pressing portion) that protrudes upward from an upper surface of the bottom wall of the slider 16. A front surface of the upper pressing portion 25A and a front surface of the lower pressing portion 25B includes sloped surfaces. With the sloped surfaces, the rear end of the upper holding section 18A and the rear end of the lower holding section 18B are guided to the upper pressing portion 25A and the lower pressing portion 25B, respectively.

As illustrated in FIG. 1, sidewalls of the slider include temporary receiving holes 26 at positions closer to the front edge. The sidewalls of the slider 16 include permanent receiving holes 27 behind the temporary receiving holes 26. Holding protrusions 28 on the left wall 34 and a right wall 35 of the terminal body 15 can be elastically held in the temporary receiving holes 26 or the permanent receiving holes 27.

When the holding protrusions 28 of the terminal body 15 are held in the temporary receiving holes 26 of the slider 16, the slider 16 is held at a temporary holding position relative to the terminal body 15 (see FIG. 1). At this position, the upper pressing portion 25A and the lower pressing portion 25B of the slider 16 are separated rearward from the rear edges of the upper holding section 18A and the lower holding section 18B of the terminal body 15. Further, a gap between the upper holding section 18A and the lower holding section 18B is greater than the diameter of the core wire 13.

Figure 5:
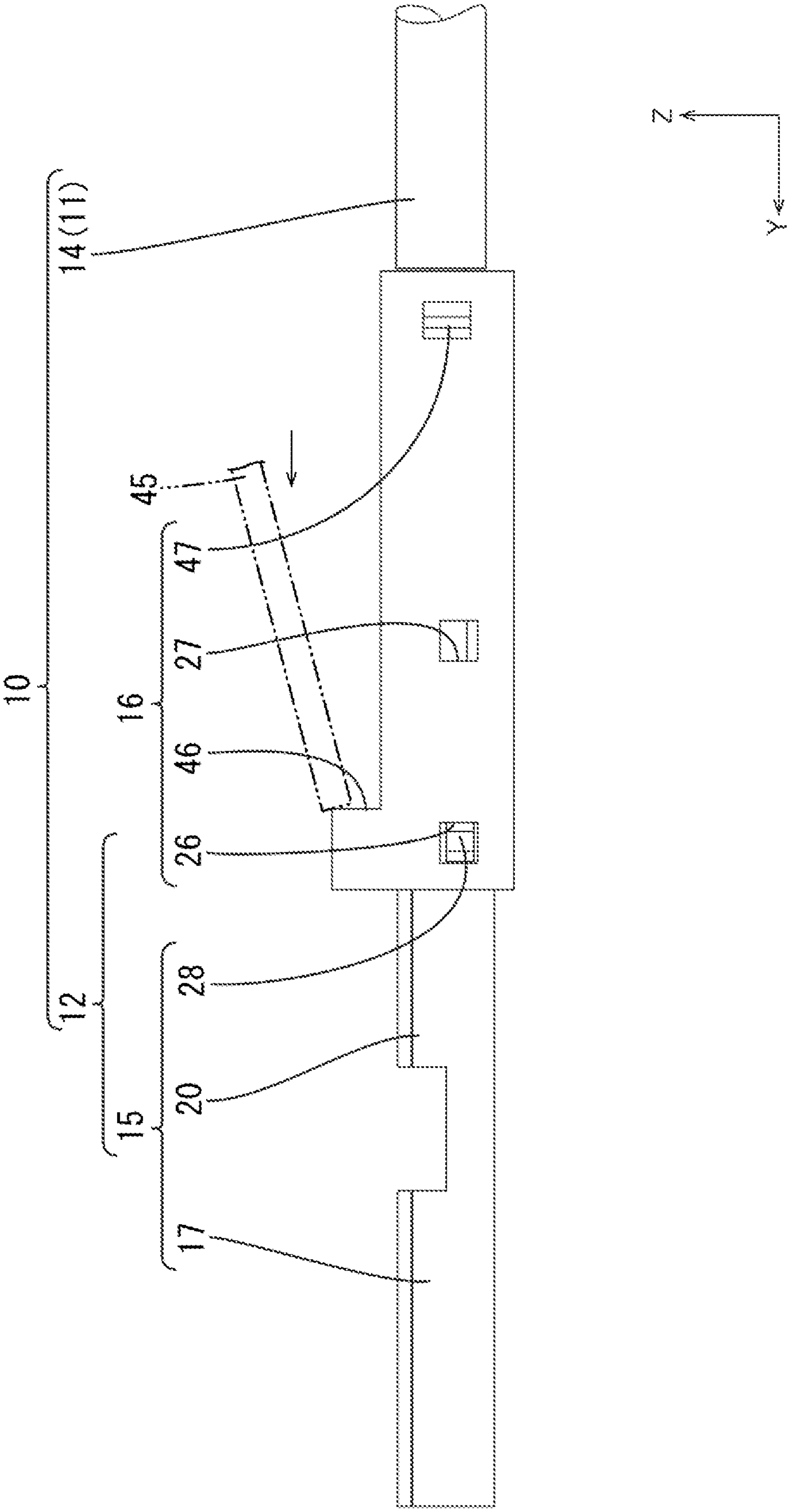
FIG. 5 is a side view illustrating a step in which a slider at a temporary holding position relative to the terminal body is pushed forward with a jig.

When the holding protrusions 28 of the terminal body 15 are held in the permanent receiving holes 27 of the slider 16, the slider 16 is held at the permanent holding position relative to the terminal body 15 (see FIG. 5). At this position, the upper pressing portion 25A of the slider 16 contacts the upper holding section 18A from above. Further, the lower pressing portion 25B of the slider 16 contacts the lower holding section 18B from below.

As described above, while the slider 16 is fitted on a section of the terminal body 15 including the upper holding section 18A and the lower holding section 18B, the slider 16 is slidable in the front-rear direction between the temporary holding position and the permanent holding position.

As illustrated in FIG. 2, when the slider 16 is held at the permanent holding position relative to the terminal body 15, the upper pressing portion 25A presses the upper holding section 18A and thus the upper holding section 18A bends downward. Further, the lower pressing portion 25B presses the lower holding section 18B and thus the lower holding section 18B bends upward. When the core wire 13 is disposed in the gap between the upper holding section 18A and the lower holding section 18B to extend in the front-rear direction (an extending direction) and the slider 16 is held at the permanent holding position relative to the terminal body 15, the core wire 13 is sandwiched between the upper holding section 18A and the lower holding section 18B that are bent in the top-bottom direction. Namely, the upper holding section 18A that is pressed downward from above by the upper pressing portion 25A contacts the core wire 13 and the lower holding section 18B that is pressed upward from below by the lower pressing portion 25B contacts the core wire 13.

As illustrated in FIG. 2, when the slider 16 is held at the permanent holding position relative to the terminal body 15, the upper holding protrusion 23A of the upper holding section 18A presses the core wire 13 from above and the lower holding protrusion 23B of the lower holding section 18B presses the core wire 13 from below. The core wire 13 that is pressed by the upper holding protrusion 23A from above and by the lower holding protrusion 23B from below is bent in the top-bottom direction (an example of a direction crossing the extending direction) because the lower holding protrusion 23B is displaced from the upper holding protrusion 23A in the front-rear direction. The core wire 13 is bent in a crank shape when viewed from side and held by the upper holding protrusion 23A and the lower holding protrusion 23B. With the upper holding protrusion 23A and the lower holding protrusion 23B, the core wire 13 is electrically connected to the terminal 12.

As illustrated in FIG. 5, the jig contact section 46 is in a front end of the upper wall of the slider 16. When the jig 45 contacts the jig contact section 46 from the rear, the slider 16 is pushed forward by the jig 45. That is, the slider 16 moves forward. The jig 45 is smaller than a die or equipment to move the die. Therefore, an increase in cost related to the jig 45 is less likely to occur.

As illustrated in FIG. 5, the slider 16 includes two drawing sections 47 at a position closer to the rear edge of the slider 16. The drawing sections 47 protrude from the right wall and the left wall to an inner side of the slider 16. The drawing sections 47 have a width that decreases from the rear side to the front side. With the core wire 13 sliding on inner surfaces of the drawing sections 47, the core wire 13 is guided into the slider 16.

Steps of Producing the Electric Cable 10 Including the Terminal

Next, steps of producing the terminal wire assembly 10 according to this embodiment will be described. The steps of the terminal wire assembly 10 are not limited to those described below.

Figure 6:
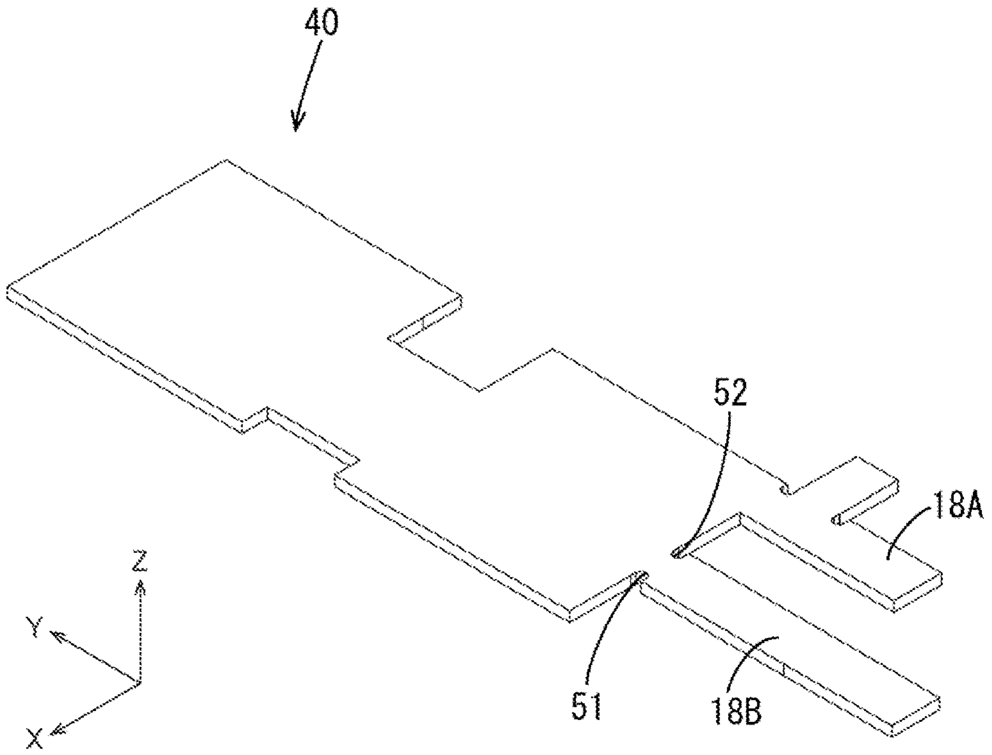
FIG. 6 is a perspective view of a metal sheet from which the terminal body is formed.
Figure 7:
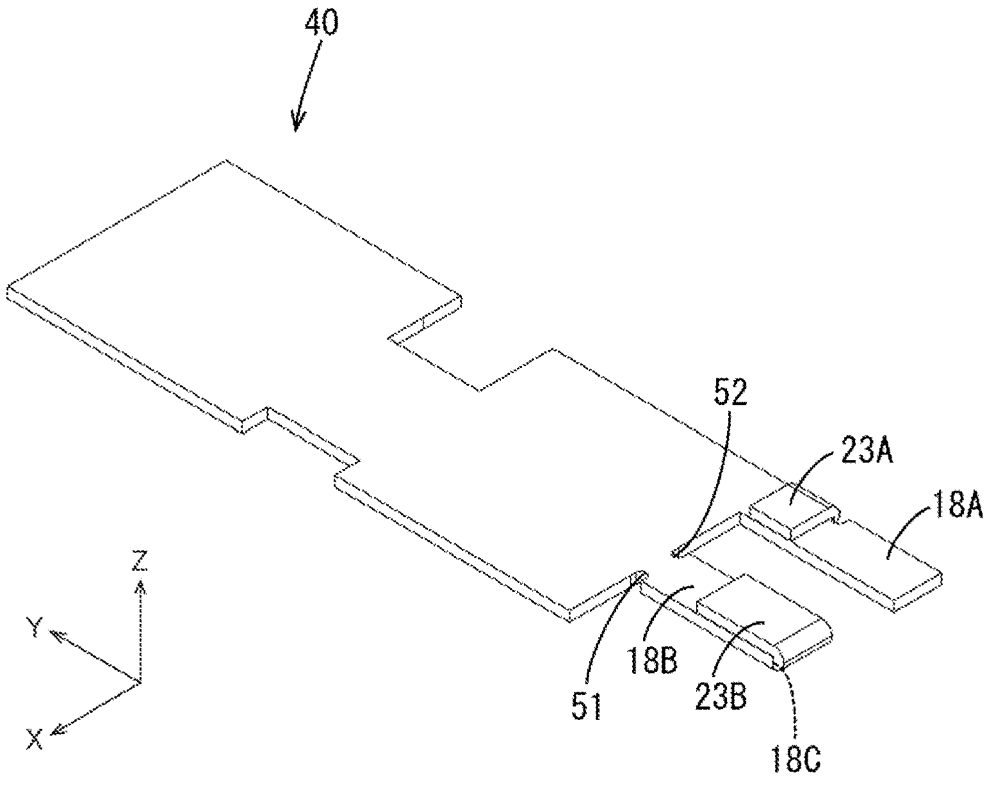
FIG. 7 is a perspective view illustrating a step in a production of the terminal body.

A metal sheet 40 in a shape illustrated in FIG. 6 is prepared by pressing. Then, the upper holding protrusion 23A is folded over the upper holding section 18A and the lower holding protrusion 23B is folded over the lower holding section 18B as illustrated in FIG. 7.

Figure 8:
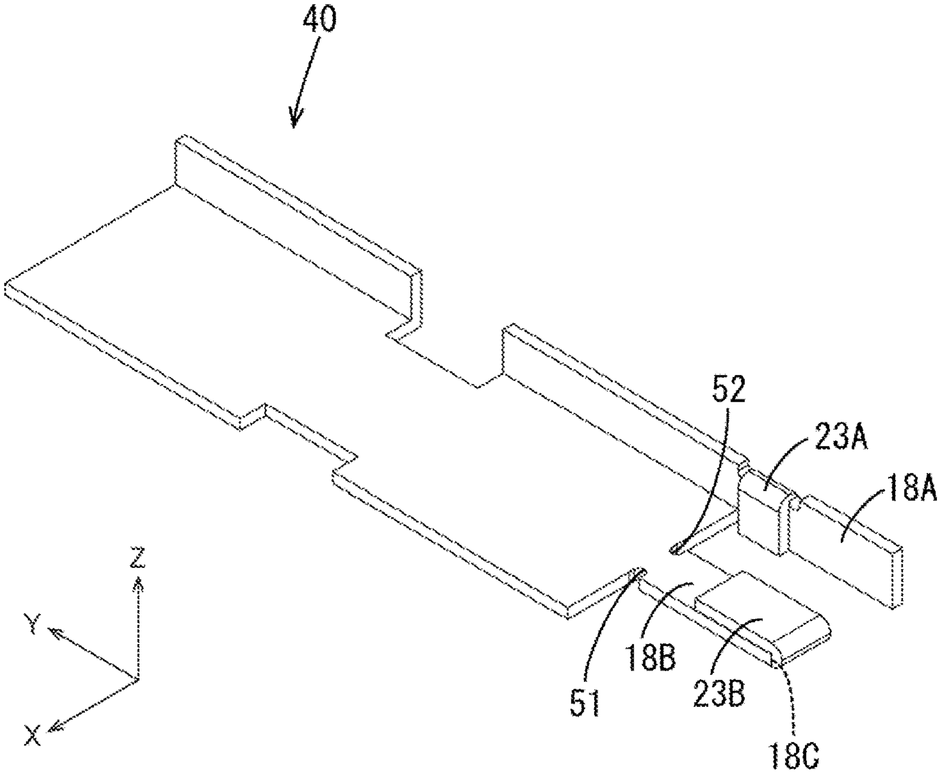
FIG. 8 is a perspective view illustrating a step in the production of the terminal body.
Figure 9:
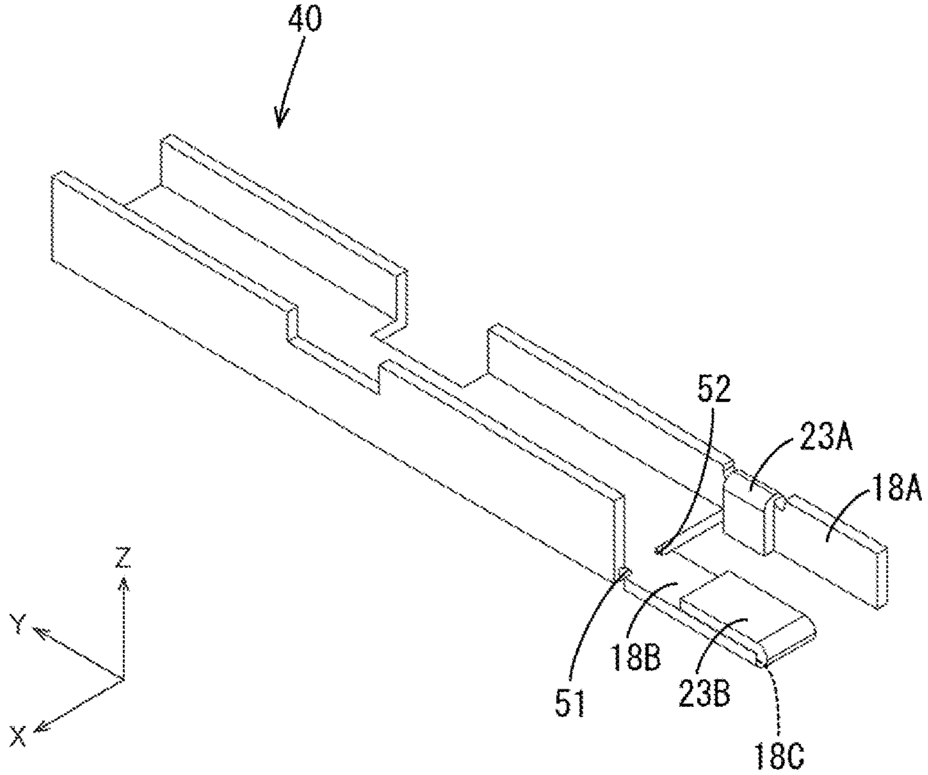
FIG. 9 is a perspective view illustrating a step in the production of the terminal body.

As illustrated in FIG. 8, a portion to form the upper wall of the terminal body 15 is bent. As illustrated in FIG. 9, a portion to form the left wall 34 of the terminal body 15 is bent. A portion to form the right wall 35 of the terminal body 15 is bent. Through these steps, the terminal body 15 is prepared.

The slider 16 is prepared by a known method.

The slider 16 is attached to the terminal body 15 from the rear. The front edge of the slider 16 contacts the holding protrusions 28 of the terminal body 15 from the rear and the sidewalls of the slider 16 deform to expand. When the slider 16 is pushed further forward, the sidewalls of the slider 16 recover. As a result, the holding protrusions 28 of the terminal body 15 are fitted in the temporary receiving holes 26 of the slider 16 and the slider 16 is held at the temporary holding position relative to the terminal body 15. The terminal 12 is obtained (see FIG. 5).

The section of the core wire 13 of the electric wire 11 is exposed by striping the section of the insulating sheath with a known method. The front end of the core wire 13 is inserted into the slider 16 from the rear end of the slider 16. The core wire 13 is guided into the slider 16 with the drawing sections 47 of the slider 16 contacting the core wire 13. When the core wire 13 is pushed further forward, the front end of the core wire 13 enters the inside of the terminal body 15 and reaches the gap between the upper holding section 18A and the lower holding section 18B.

When the slider 16 is held at the temporary holding position relative to the terminal body 15, the gap between the upper holding section 18A and the lower holding section 18B is greater than the outer diameter of the core wire 13.

As illustrated in FIG. 5, the jig 45 is brought into contact with the jig contact section 46 from the rear to slide the slider 16 frontward. The slider 16 is slid frontward relative to the terminal body 15. The holding protrusions 28 of the terminal body 15 are released from the temporary receiving holes 26 of the slider 16. The sidewalls of the slider 16 slide on the holding protrusions 28 and thus the sidewalls of the slider 16 deform to expand.

When the slider 16 is moved forward, the sidewalls of the slider 16 recover and the holding protrusions 28 of the terminal body 15 are elastically fitted in the permanent receiving holes 27 of the slider 16. As a result, the slider 16 is held at the temporary holding position relative to the terminal body 15.

With the slider 16 held at the permanent holding position relative to the terminal body 15, the upper pressing portion 25A of the slider 16 contacts the upper holding section 18A of the terminal body 15 from above and presses the upper holding section 18A downward. The lower pressing portion 25B of the slider 16 contacts the lower holding section 18B of the terminal body 15 from below and presses the lower holding section 18B upward. Therefore, the core wire 13 is sandwiched between the upper holding section 18A and the lower holding section 18B in the top-bottom direction (see FIG. 2).

As illustrated in FIG. 2, the core wire 13 is sandwiched between the lower surface of the upper holding section 18A and the upper surface of the lower holding section 18B. The oxide film on the surface of the core wire is striped and a metal surface of the core wire 13 is exposed. With the metal surface contacting the upper holding section 18A and the lower holding section 18B, the electric wire 11 is electrically contacted to the terminal 12.

When the core wire 13 is sandwiched between the upper holding section 18A and the lower holding section 18B in the top-bottom direction, the core wire 13 is sandwiched between the upper holding protrusion 23A on the upper holding section 18A and the lower holding protrusion 23B on the lower holding section 18B. The core wire 13 is stretched in the front-rear direction and bent in the top-bottom direction. According to the configuration, the core wire 13 is firmly held and thus the electric wire 11 and the terminal 12 are held together with a greater force even when the electric wire 11 is pulled. The terminal wire assembly 10 is complete.

Operation and Effects of this Embodiment

Next, operation and effects of this embodiment will be described. This embodiment includes the terminal 12 coupled to the front end of the electric wire 11 with respect to the extending direction. The terminal 12 includes the terminal body 15 and the slider 16. The terminal body 15 includes the upper holding section 18A and the lower holding section 18B that holds the electric wire 11. The slider 16 is slidable on the terminal body 15 in the extending direction in which the electric wire 11 extends. The slider 16 includes the upper pressing portion 25A and the lower pressing portion 25B that press the upper holding section 18A and the lower holding section 18B toward the electric wire 11, respectively. The terminal body 15 is formed from the metal sheet that is bent. The upper holding section 18A and the lower holding section 18B include the upper holding protrusion 23A and the lower holding protrusion 23B, respectively. The upper holding protrusion 23A and the lower holding protrusion 23B contact the core wire 13 of the electric wire 11. The upper holding protrusion 23A is formed by folding the metal sheet.

The terminal wire assembly 10 according to this embodiment includes the terminal 12 and the electric wire 11 coupled to the terminal 12.

Because the upper holding protrusion 23A and the lower holding protrusion 23B are formed by folding the metal sheet, the production cost of the terminal 12 is reduced in comparison to holding protrusions that are prepared by hammering that is performed separately.

According to this embodiment, the terminal body 15 includes the upper holding section 18A and the lower holding section 18B. The upper holding section 18A and the lower holding section 18B include the upper holding protrusion 23A and the lower holding protrusion 23B, respectively. The upper holding protrusion 23A and the lower holding protrusion 23B are displaced from each other in the extending direction in which the electric wire 11 extends.

The core wire 13 held by the upper holding section 18A and the lower holding section 18B is bent in the direction that crosses the extending direction in which the electric wire 11 extends by the upper holding protrusion 23A and the lower holding protrusion 23B that are displaced from each other in the extending direction. With the core wire 13 of the electric wire 11 bent, the edges 50A and 50B of the upper holding protrusion 23A and the lower holding protrusion 23B dig into the core wire 13 of the electric wire 11. According to the configuration, the terminal 12 is electrically connected to the electric wire 11 with reliability. Because the terminal body 15 is prepared by pressing the metal sheet, the edges 50A and 50B are sharply formed. Therefore, the edges 50A and 50B can easily dig into the core wire 13.

The lower holding section 18B includes the lower holding protrusion 23B at the rear edge 18C that is the side edge that crosses the extending direction in which the electric wire 11 extends. The lower holding protrusion 23B is formed by folding the metal sheet.

Because the metal sheet that protrudes in the extending direction in which the electric wire 11 extends may be used for a coupling portion that is coupled to a carrier. In comparison to a configuration in which a coupling portion of a metal sheet protrudes in a direction crossing the extending direction in which the electric wire extends, yield improves.

In this embodiment, the left fragile section 51 and the right fragile section 52 are formed at the left edge 32 and the right edge 33 of the lower holding section 18B to reduce the width of the lower holding section 18B in the right-left direction (the direction that crosses the extending direction in which the electric wire 11 extends).

With the left fragile section 51 and the right fragile section 52 formed at a predefined position at which the lower holding section 18B is designed to bend, the lower holding section 18B can be bent at the predefined position. According to the configuration, the upper holding section 18A and the lower holding section 18B properly holds the electric wire 11. Therefore, the reliability in electric connection between the terminal 12 and the electric wire 11 increases.

In this embodiment, the upper holding section 18A includes the upper holding protrusion 23A that is folded at the left edge 30 of the upper holding section 18A.

With the upper holding protrusion 23A in the area of the upper holding section 18A that is not designed to be bent, the upper holding section 18A is less likely to be bent at an unintended position. Because the upper holding protrusion 23A is formed by folding the metal sheet, an increase in production cost is less likely to occur.

Second Embodiment

A terminal 62 and an terminal wire assembly 60 according to a second embodiment will be described with reference to FIGS. 10 to 12.

Figure 10:
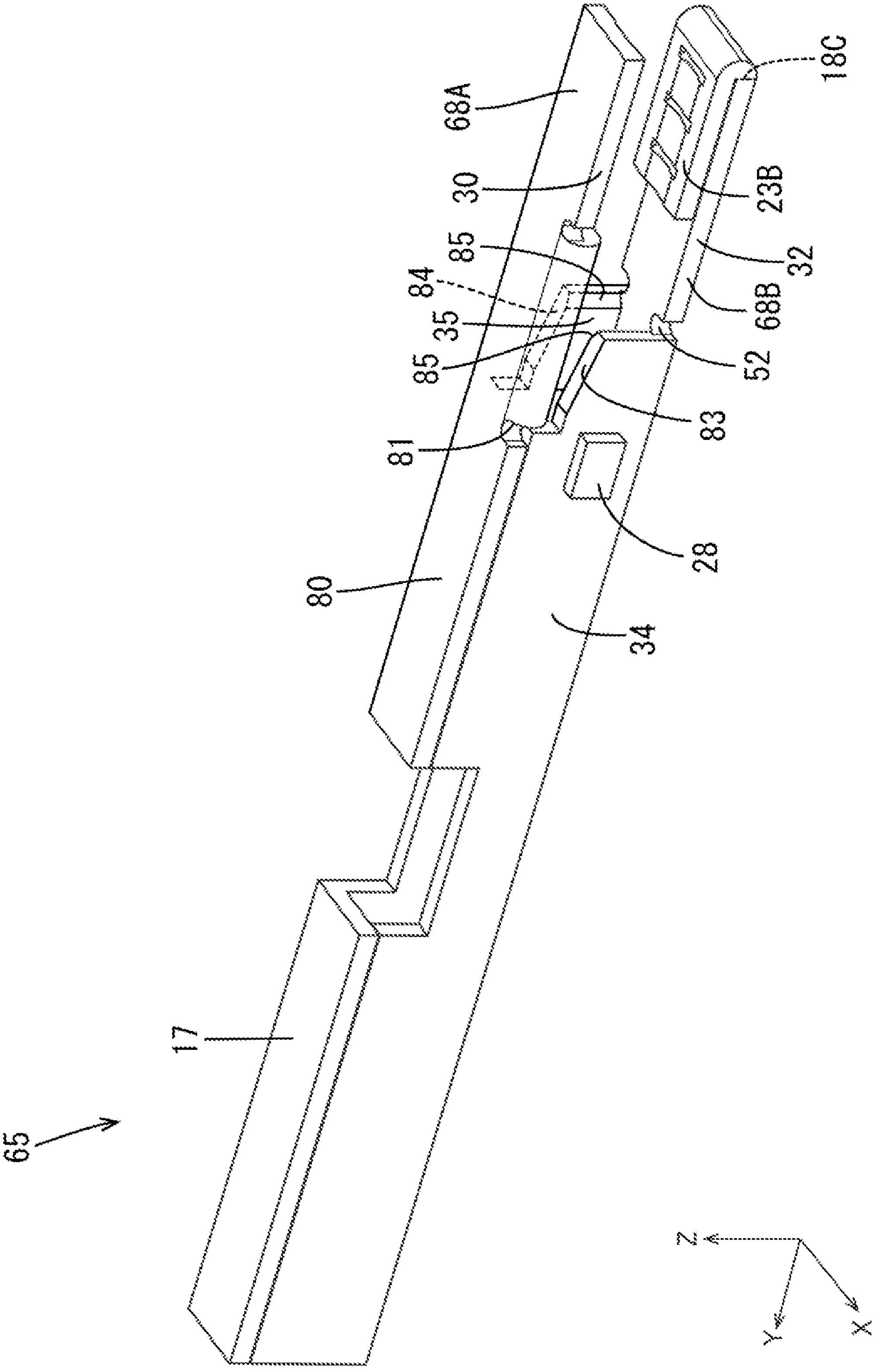
FIG. 10 is a perspective view of a terminal body according to a second embodiment.

As illustrated in FIG. 10, an upper holding protrusion 73A is formed at the left edge 30 of an upper holding section 68A of a terminal body 65. The upper holding protrusion 73A projects from the left edge 30 of the upper holding section 68A. The upper holding protrusion 73A is folded to abut on a lower surface of the upper holding section 68A. An area of the upper holding section 68A in which the upper holding protrusion 73A is provided is reinforced by the upper holding protrusion 73A and thus less likely to warp.

As illustrated in FIG. 10, a left wall 34 of a wire coupling portion 80 has a height that decreases from the front toward the rear in an area in which the upper holding protrusion 73A is provided. A left restricting section 83 (an example of a bending restricting section) is formed at an upper edge of the left wall 34 of the wire coupling portion 80 in an area between a left fragile section 81 of the upper holding section 68A and a left fragile section 81 of a lower holding section 68B with respect to the front-rear direction. The left restricting section 83 slopes down toward the rear.

Figure 11:
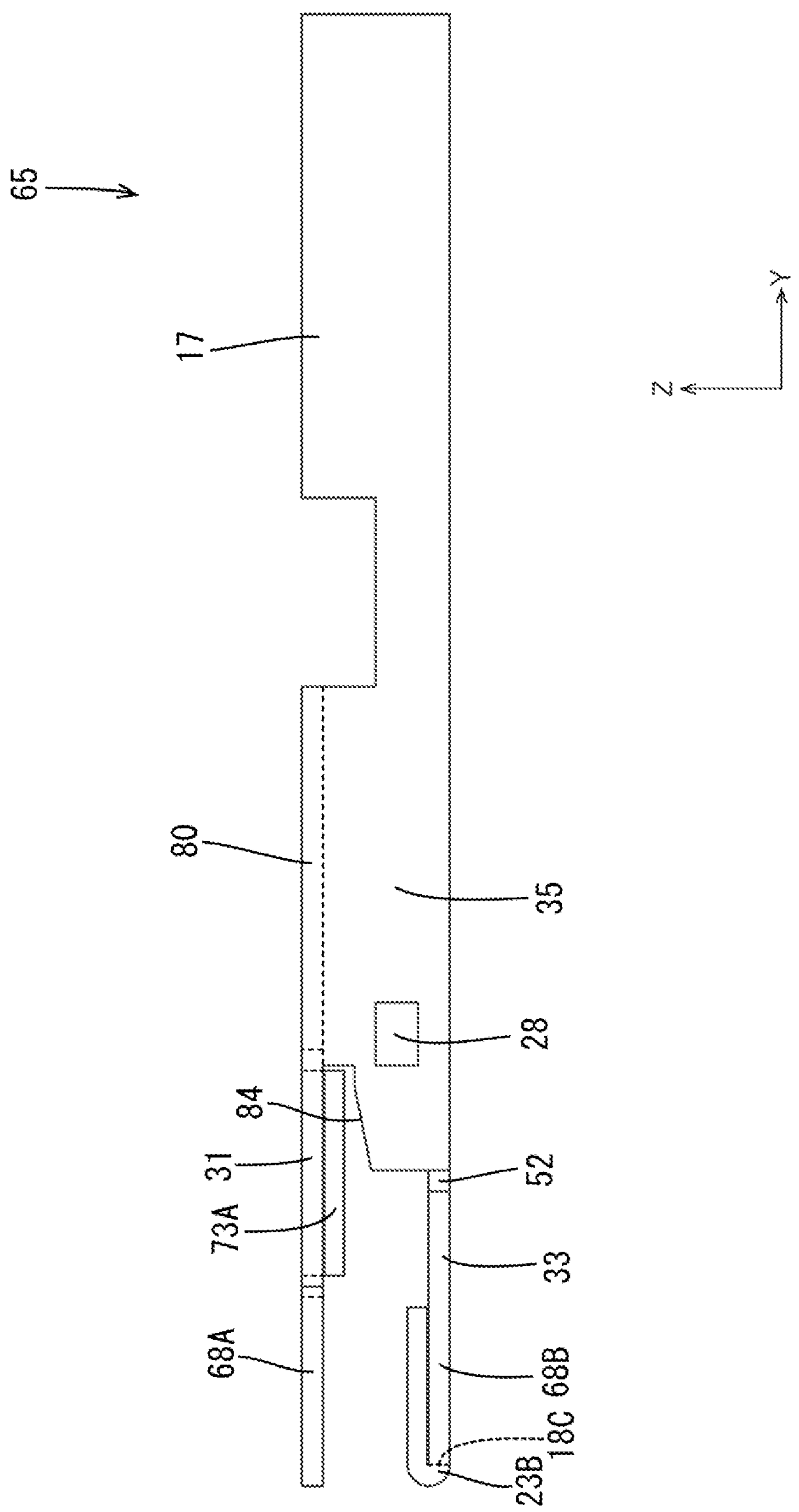
FIG. 11 is a right-side view of the terminal body.

As illustrated in FIG. 11, a right wall 35 of the wire coupling portion 80 has a height that decreases from the front toward the rear in the area in which the upper holding protrusion 73A is provided. A right restricting section 84 (an example of a bending restricting section) is formed at a rear edge of the right wall 35 of the wire coupling portion 80 in an area between a right fragile section 82 of the upper holding section 68A and a right fragile section 82 of the lower holding section 68B with respect to the front-rear direction. The right restricting section 84 slopes down toward the rear.

Figure 12:
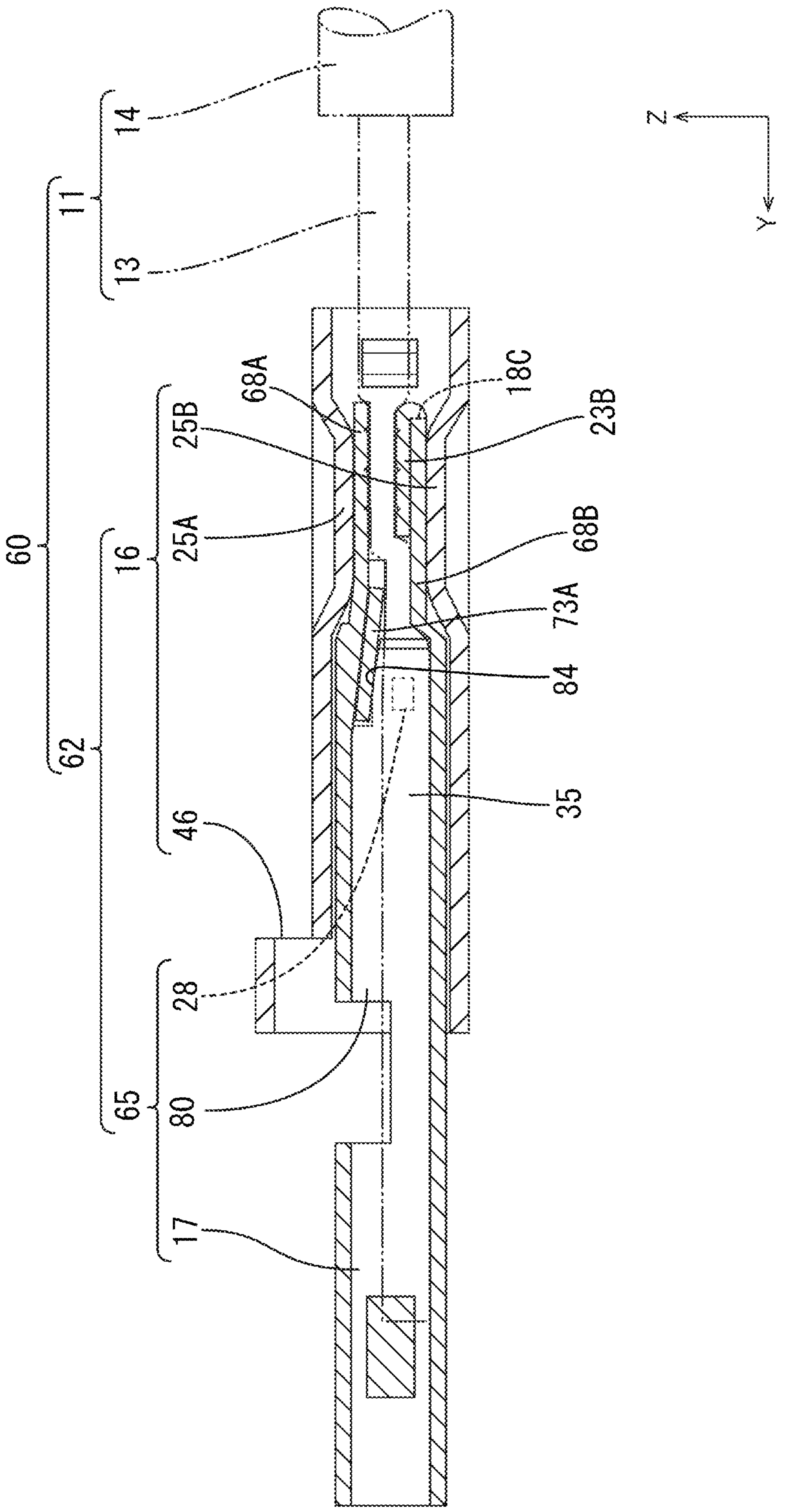
FIG. 12 is a side cross-sectional view of a terminal wire assembly.

As illustrated in FIG. 12, with the slider 16 moved to the permanent holding position relative to the wire coupling portion 80, an upper surface of the right restricting section 84 contacts the right edge of the upper holding protrusion 73A of the upper holding section 68A that is pressed downward by the upper pressing portion 25A of the slider 16. As a result, the upper holding section 68A is less likely to excessively warp downward. With an upper surface of the left restricting section 83 contacting the left edge of the upper holding section 68A, although such a condition is not illustrated in detail, the upper holding section 68A is less likely to excessively warp downward.

As illustrated in FIG. 10, a rear end of the right wall 35 of the wire coupling portion 80 includes a chamfered section 85 that is sloped toward a right-rear side. With the chamfered section 85, burrs that may be produced during pressing of the metal sheet can be removed. A rear end of the left wall 34 of the wire coupling portion 80 incudes a chamfered section 85.

Other configurations are similar to the configurations of the first embodiment. Components of the second embodiment the same as the components of the first embodiment will be indicated by the reference signs that indicate the components of the first embodiment and will not be described.

Operation and Effects of This Embodiment

Next, operation and effects of this embodiment will be described. In this embodiment, the upper holding section 68A includes the upper holding protrusion 73A that is folded at the left edge 30 of the upper holding section 68A.

With the upper holding protrusion 73A provided in the area of the upper holding section 68A that is not designed to be bent, the upper holding section 68A is less likely to bend at an unintended position. The upper holding protrusion 73A is formed by holding the metal sheet and thus the increase in production cost is less likely to occur.

In this embodiment, the left wall 34 and the right wall 35 of the terminal body 65 include the left restricting section 83 and the right restricting section 84, respectively. The left restricting section 83 and the right restricting section 84 contact the upper holding section 68A when the upper pressing portion 25A presses the upper holding section 68A so that the upper holding section 68A is less likely to excessively warp.

Because the left restricting section 83 and the right restricting section 84 restrict the upper holding section 68A from excessive warping, the upper holding section 68A holds the electric wire with a proper pressure. According to the configuration, the reliability in electric connection between the terminal 62 and the electric wire 11 increases.

In this embodiment, the left wall 34 and the right wall 35 of the terminal body 65 project from the left edge 30 and a right edge 31 of the upper holding section 68A. The rear ends of the left wall 34 and the right wall 35 include the chamfered sections 85 that is sloped outward from the inner side of the terminal body 65 toward the rear.

When the core wire 13 of the electric wire 11 is inserted into the terminal body 65 from the rear end with respect to the extending direction in which the electric wire extends, the core wire 13 is guided to the inner side of the terminal body 65 by the chamfered sections 85. According to the configuration, work efficiency in connecting of the electric wire 11 to the terminal 62 improves. Further, because the burrs that may be produced during the pressing of the metal sheet can be removed and thus the core wire 13 is less likely to contact the burrs.

Third Embodiment

Figure 13:
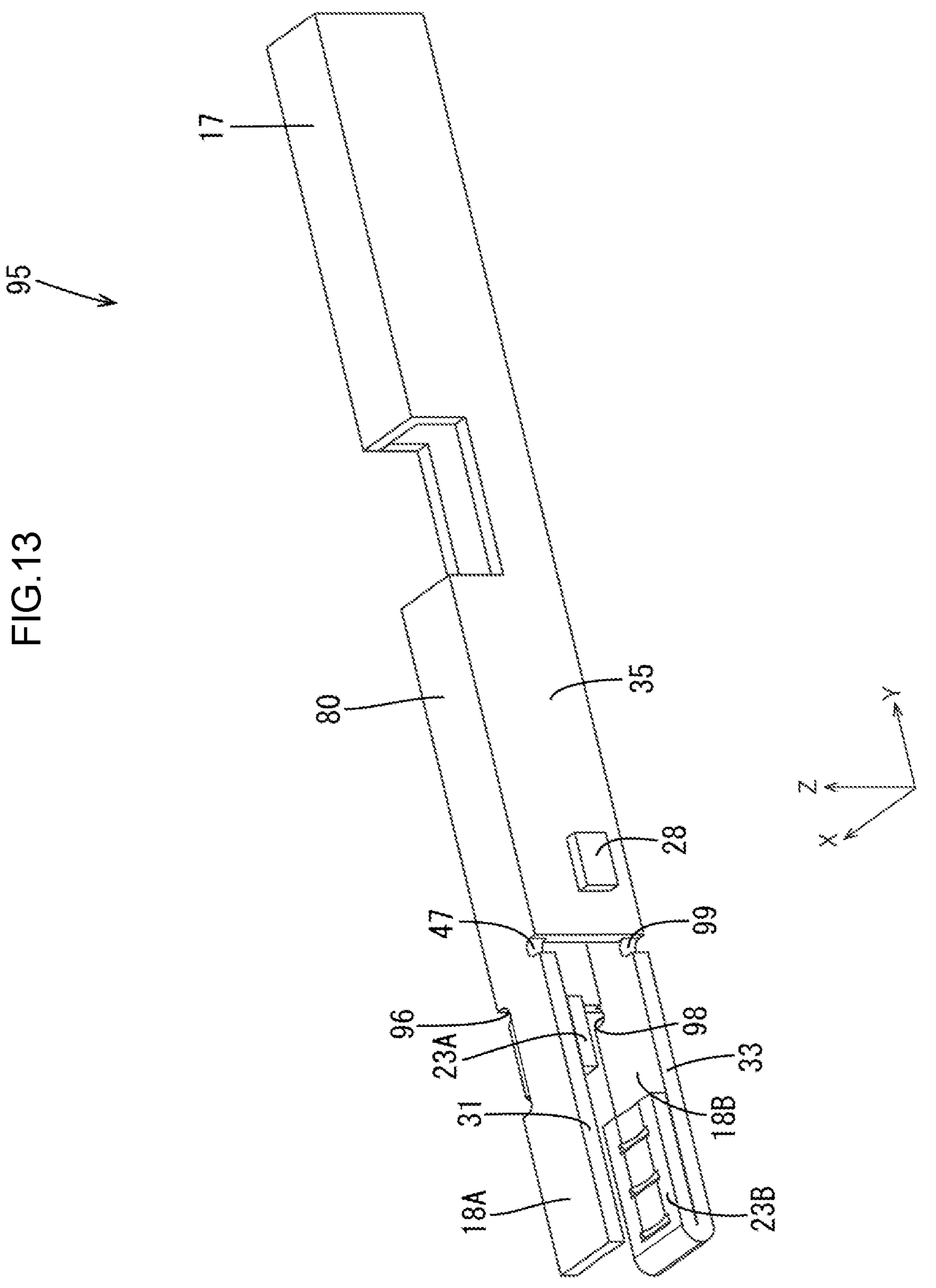
FIG. 13 is a perspective view of a terminal body according to a third embodiment.

Next, a terminal body 95 according to a third embodiment will be described with reference to FIGS. 13 and 14. As illustrated in FIG. 13, the upper holding section 18A of the terminal body 95 according to this embodiment includes a first upper fragile section 96 (an example of a first fragile section) and a second upper fragile section 97 (an example of a second fragile section). The first upper fragile section 96 is recessed from the left edge 30. The second upper fragile section 97 is recessed from the right edge 31. The first upper fragile section 96 is more to the rear than the second upper fragile section 97. Namely, the first upper fragile section 96 and the second upper fragile section 97 are displaced from each other in the front-rear direction.

Figure 14:
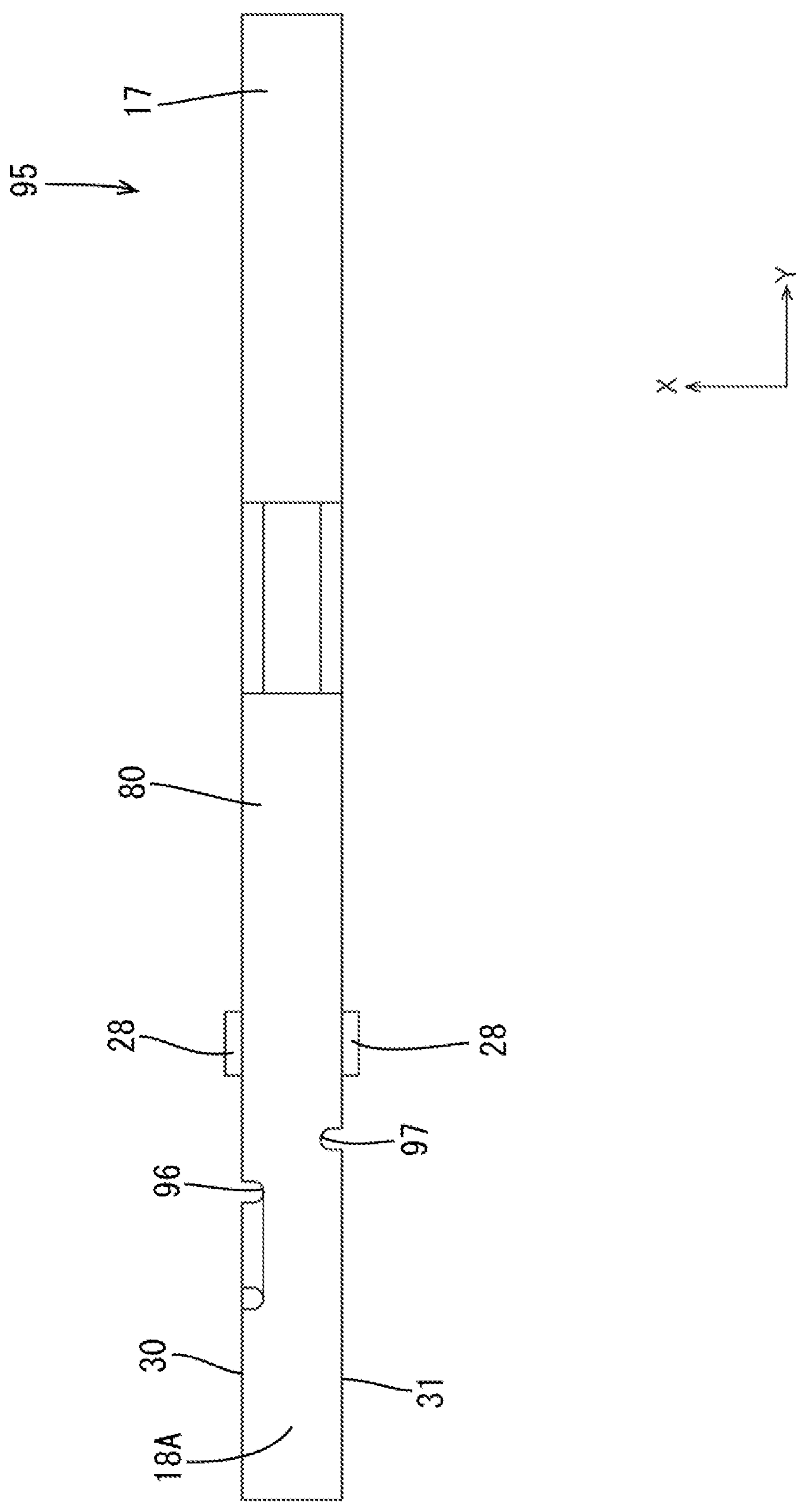
FIG. 14 is a plan view of the terminal body.

As illustrated in FIG. 14, the lower holding section 18B includes a first lower fragile section 98 (an example of a first fragile section) and a second lower fragile section 99 (an example of a second fragile section). The first lower fragile section 98 is at the left edge 32. The second lower fragile section 99 is at the right edge 33. The first lower fragile section 98 is more to the rear than the second lower fragile section 99. Namely, the first lower fragile section 98 is displaced from the second lower fragile section 99 in the front-rear direction.

Other configurations are similar to the configurations of the first embodiment. Components of the third embodiment the same as the components of the first embodiment will be indicated by the reference signs that indicate the components of the first embodiment and will not be described.

In this embodiment, the first upper fragile section 96 is at the left edge 30 of the upper holding section 18A and the second upper fragile section 97 is at the right edge of the upper holding section 18A. The first upper fragile section 96 and the second upper fragile section 97 are displaced from each other in the front-rear direction (the extending direction in which the electric wire 11 extends).

Because the first upper fragile section 96 and the second upper fragile section 97 are displaced from each other in the front-rear direction, the upper holding section 18A is less like to warp in comparison to a configuration in which the first upper fragile section 96 and the second upper fragile section 97 are at the same position with respect to the front-rear direction. Namely, the upper holding section 18A does not easily warp due to vibrations or any other fact. Therefore, the upper holding section 18A is less likely to warp at unintended timing.

In this embodiment, the first lower fragile section 98 is at the left edge 32 of the lower holding section 18B and the second lower fragile section 99 is at the right edge of the lower holding section 18B. The first lower fragile section 98 and the second lower fragile section 99 are displaced from each other in the front-rear direction (the extending direction in which the electric wire 11 extends).

Because the first lower fragile section 98 and the second lower fragile section 99 are displaced from each other in the front-rear direction, the lower holding section 18B is less like to warp in comparison to a configuration in which the first lower fragile section 98 and the second lower fragile section 99 are at the same position in the front-rear direction. Namely, the lower holding section 18B does not easily warp due to vibrations or any other fact. Therefore, the lower holding section 18B is less likely to warp at unintended timing.

Fourth Embodiment

Terminal Body 105

Figure 15:
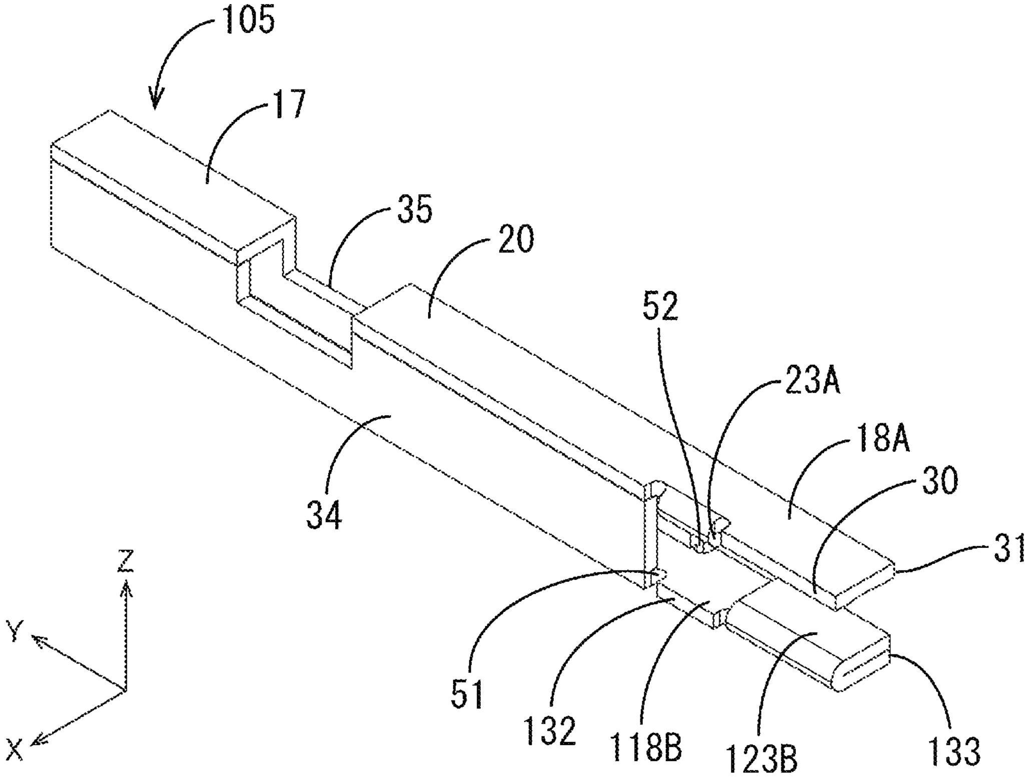
FIG. 15 is a perspective view of a terminal body according to a fourth embodiment.

A terminal body 105 according to a fourth embodiment will be described with reference to FIGS. 15 to 20. As illustrated in FIG. 15, a lower holding protrusion 123B protrudes upward from a rear section of a lower surface of a lower holding section 118B.

The lower holding protrusion 123B is formed by folding a section that projects farther than the left edge 132 (a side edge) that extends in the front-rear direction (i.e., the extending direction in which the electric wire 11 extends) onto the upper surface of a lower holding section 118B to closely contact the upper surface of the lower holding section 118B. A structure of connection between the terminal body 105 and the electric wire 11 is similar to the first embodiment and thus the electric wire 11 is not illustrated in this embodiment. The right edge of the lower holding section 118B does not project from a right edge 113 of the holding section 118B.

Steps of Producing the Terminal Body 105

Next, steps of producing the terminal body 105 according to this embodiment will be described. The steps of producing the terminal body 105 are not limited to those described below.

Figure 16:
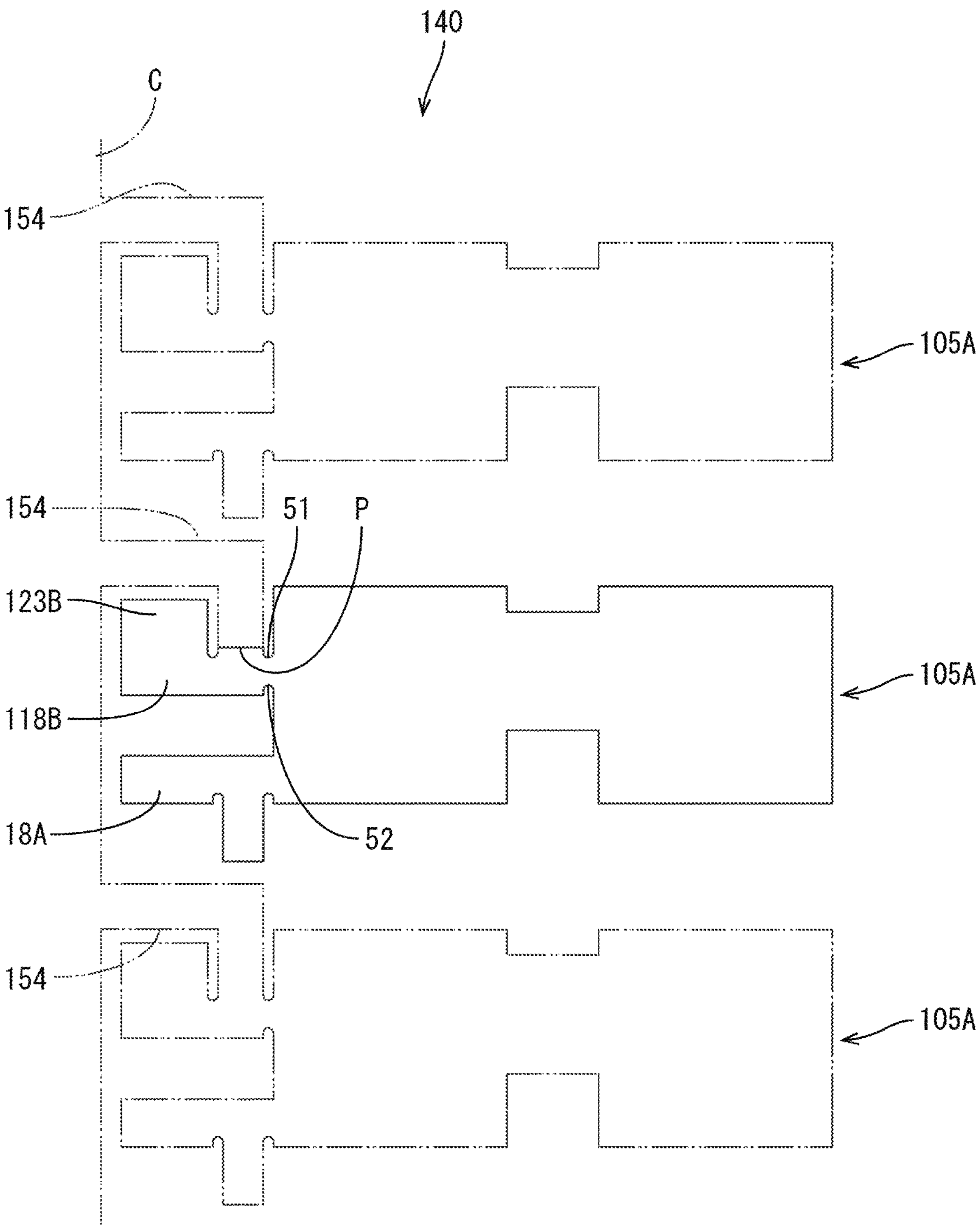
FIG. 16 is a plan view of a metal sheet from which the terminal body is formed.
Figure 17:
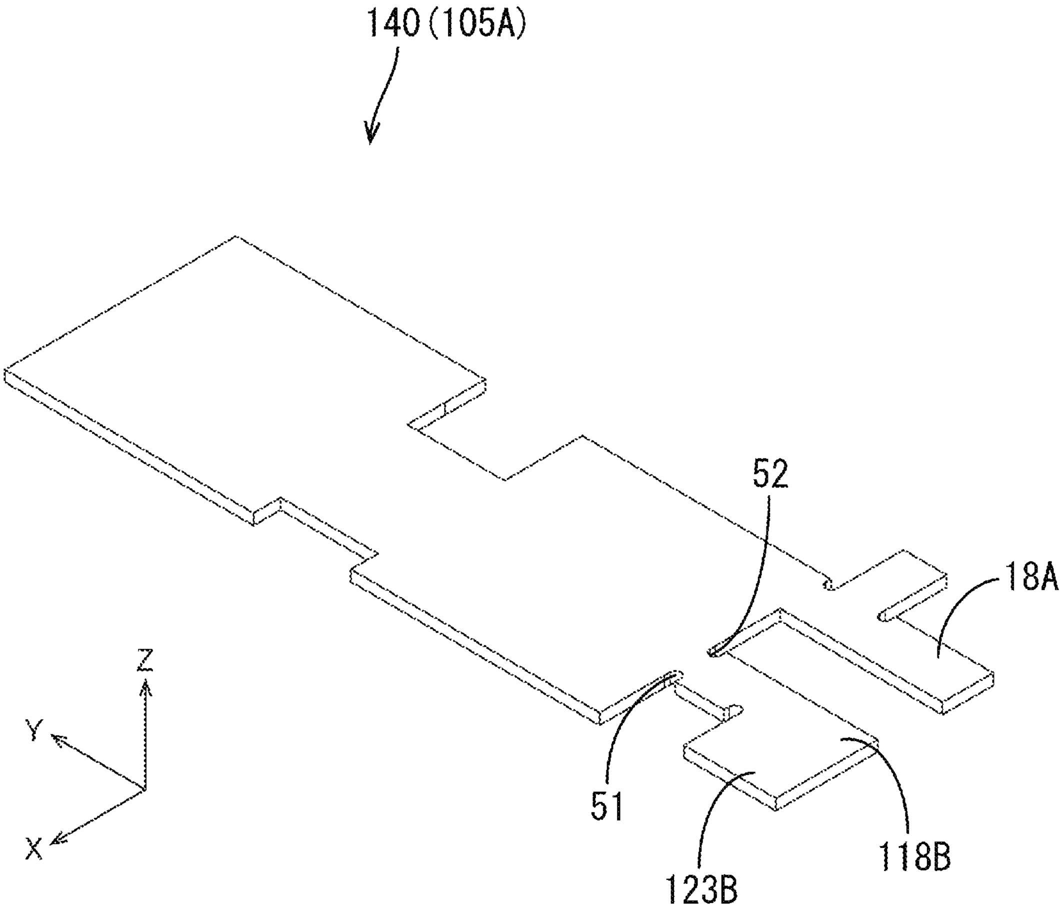
FIG. 17 is a perspective of the metal sheet from which the terminal body is formed.

A metal sheet 140 in a shape illustrated in FIG. 16 is prepared by pressing. The metal sheet 140 in the shape illustrated in FIG. 16 includes multiple terminal body portions 105A that are before bending are connected to a carrier C with coupling portions 154. The terminal body portions 105A will be separated from the carrier C and the coupling portions 154 by cutting at cutting points P. As a result, each of the terminal body portions 105A is prepared in a shape illustrated in FIG. 17.

Figure 18:
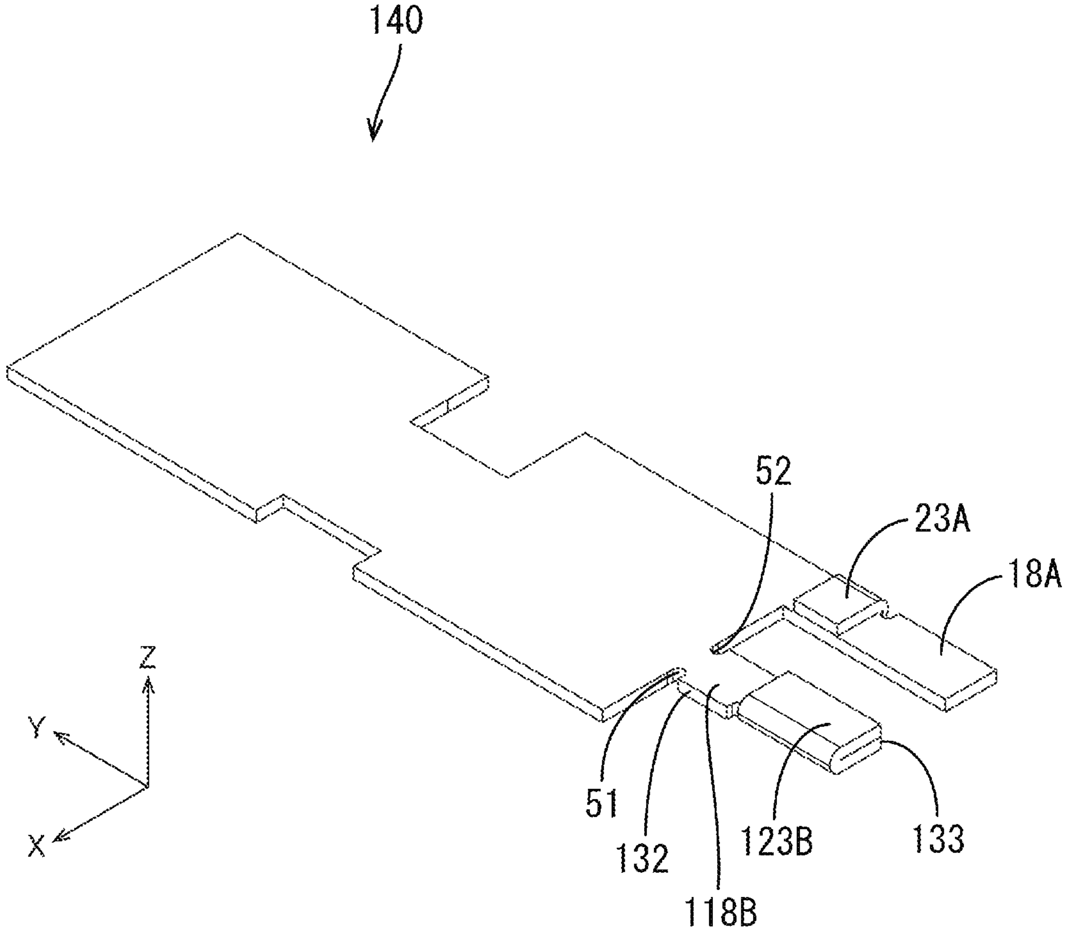
FIG. 18 is a perspective view illustrating a step in a production of the terminal body.

As illustrated in FIG. 18, the upper holding protrusion 23A is folded onto the upper holding section 18A and the lower holding protrusion 123B is folded on the lower holding section 118B.

Figure 19:
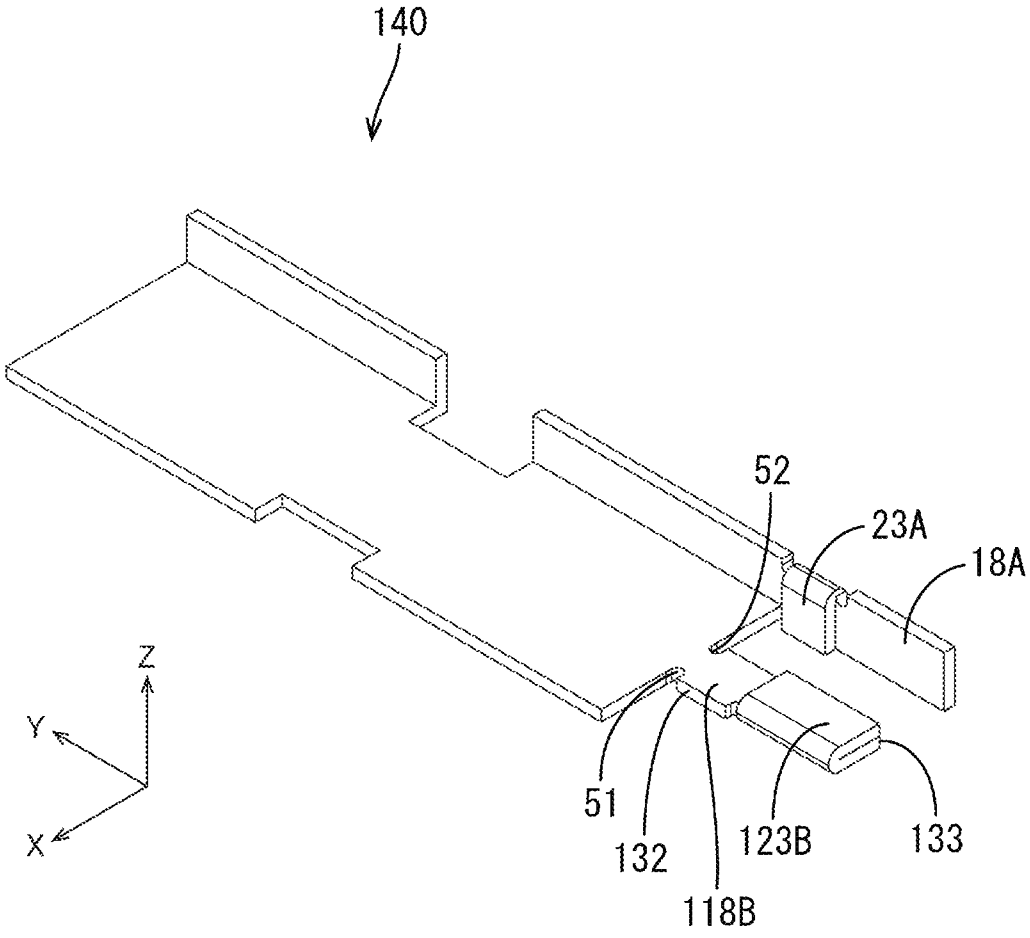
FIG. 19 is a perspective view illustrating a step in the production of the terminal body.
Figure 20:
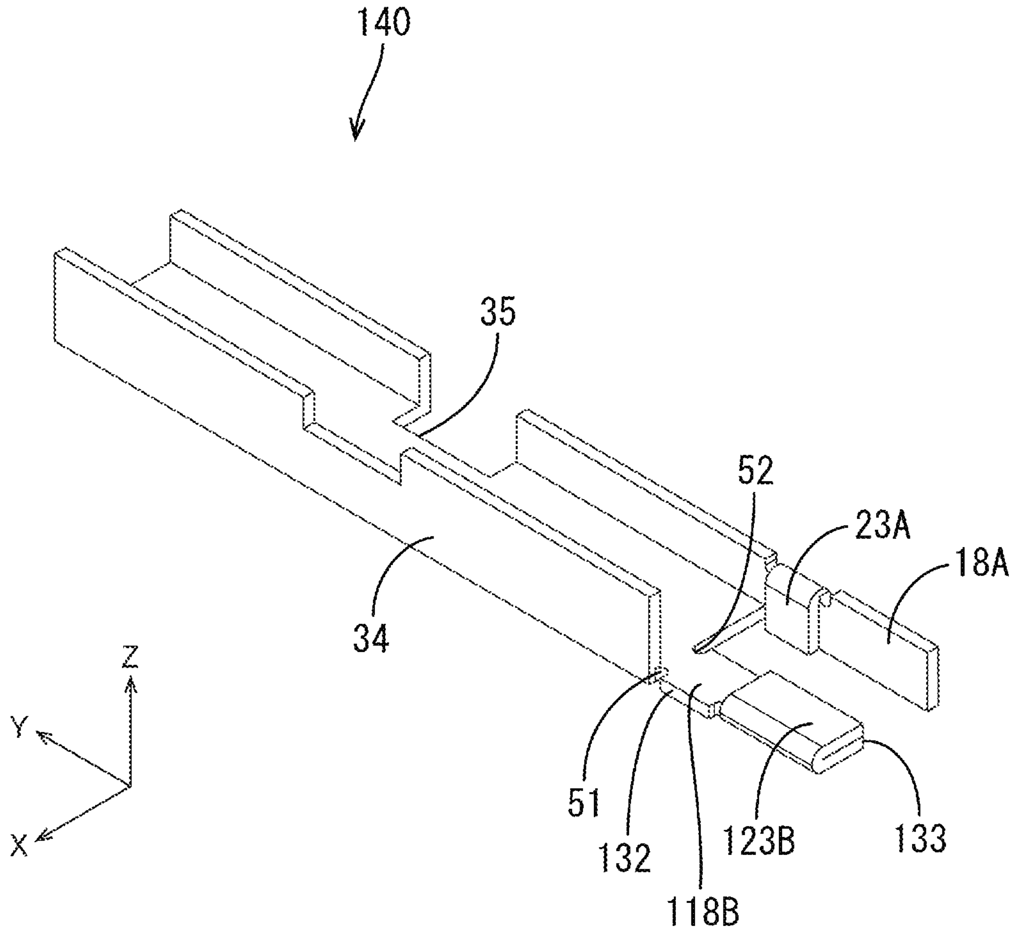
FIG. 20 is a perspective view illustrating a step in the production of the terminal body.

As illustrated in FIG. 19, a portion to form the upper wall of the terminal body 105 is folded. As illustrated in FIG. 20, a portion to form the left wall 34 of the terminal body 105 is folded. Finally, a portion to form the right wall 35 of the terminal body 105 is folded. Through the steps, the terminal body 105 is prepared.

Other configurations are similar to the configurations of the first embodiment. Components of the fourth embodiment the same as the components of the first embodiment will be indicated by the reference signs that indicate the components of the first embodiment and will not be described.

In the first embodiment, the lower holding protrusion 23B on the lower holding section 18B is formed by folding the portion of the metal sheet at the side edge that extends in the direction that crosses the extending direction in which the electric wire 11 extends (e.g., the rear edge 18C). In such a configuration, the lower holding protrusion 23B may rub against the electric wire 11 and the lower holding protrusion 23B may be turned over toward the rear when the electric wire 11 is pulled rearward. In this embodiment, the lower holding protrusion 123B is folded at the left edge 132 of the lower holding section 118B extending in the extending direction in which the electric wire 11 extends. Therefore, the lower holding protrusion 123B is less likely to be turned over.

Fifth Embodiment

[Terminal Body 205]

Figure 21:
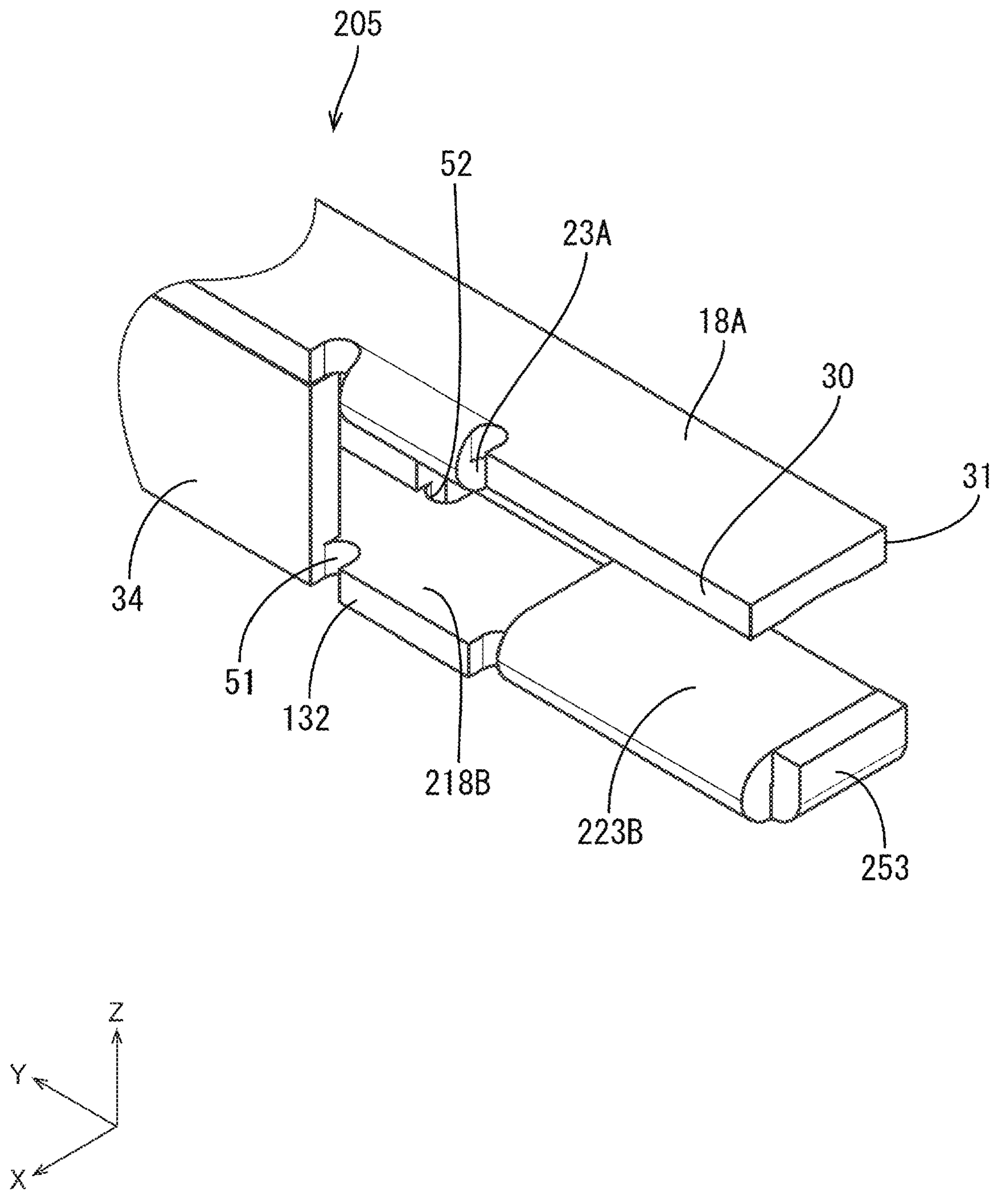
FIG. 21 is a perspective view of a terminal body according to a fifth embodiment.
Figure 22:
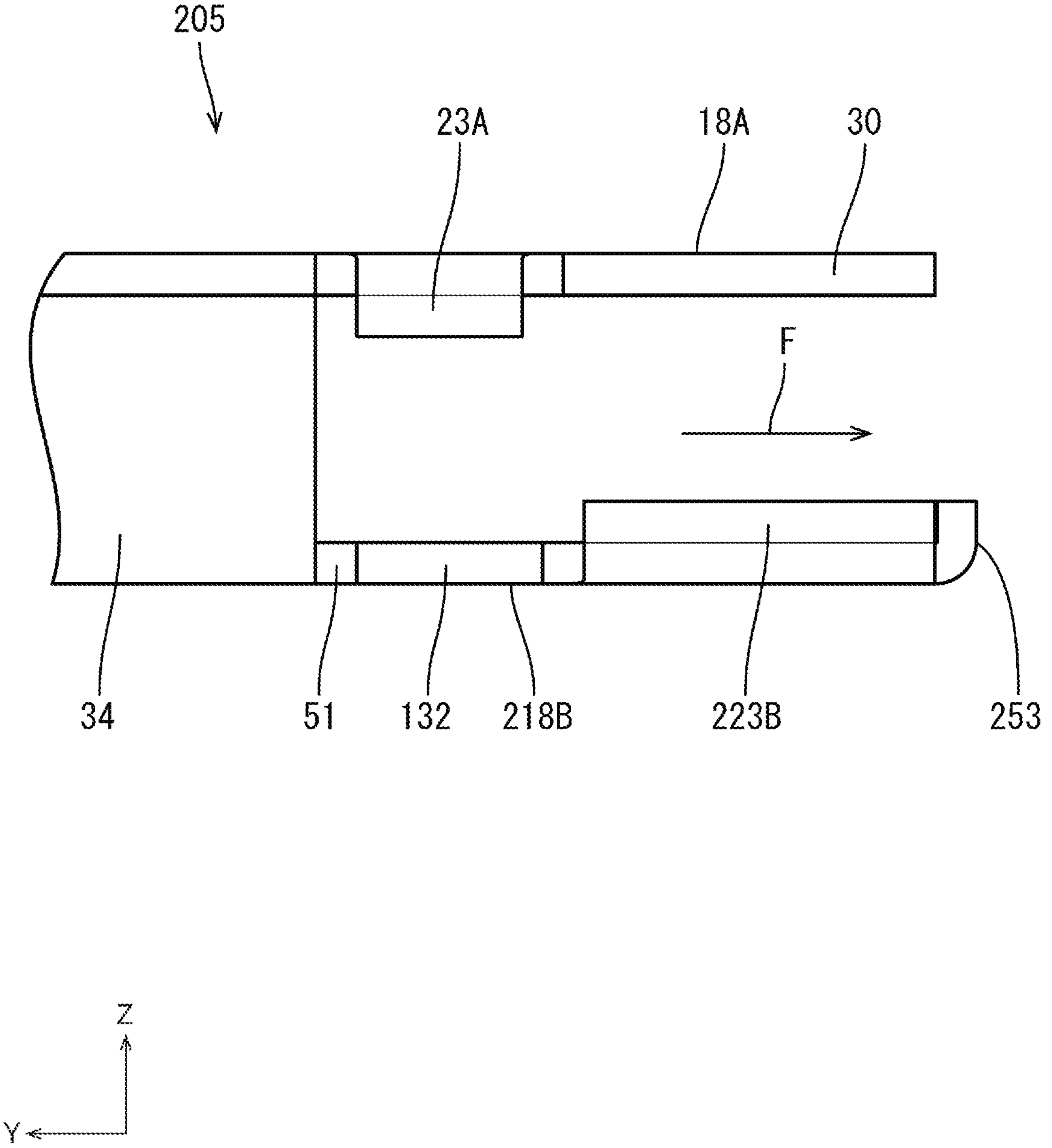
FIG. 22 is a magnified side view a portion of the terminal body including a lower holding section.

A terminal body 205 according to a fifth embodiment of this disclosure will be described with reference to FIGS. 21 and 22.

Rear Receiving Section 253

A lower holding section 218B includes a rear receiving section 253. The rear receiving section 253 protrudes from a rear end of a lower holding protrusion 223B (a holding protrusion) toward the electric wire 11 in the front-rear direction (i.e., the extending direction in which the electric wire 11 extends). A connecting structure of the terminal body 105 to the electric wire 11 is similar to the first embodiment and thus the electric wire 11 is not illustrated in this embodiment. The rear receiving section 253 is formed by folding a section that protrudes rearward from the rear end of the lower holding protrusion 223B upward.

The rear receiving section 253 and the lower holding protrusion 223B are opposed to each other in the front-rear direction and adjacent to each other or closely attached to each other. An upper edge of a front end of the rear receiving section 253 is at a height equal to or slightly below the upper edge of the lower holding protrusion 223B. According to the configuration, when the core wire 13 of the electric wire 11 is inserted into the gap between the upper holding section 18A and the lower holding section 218B, the core wire 13 is less likely to touch the front end of the rear receiving section 253.

For example, when the electric wire 11 is pulled rearward, the lower holding protrusion 223B slides with the electric wire 11. When the lower holding protrusion 223B is pulled rearward along with the electric wire 11, the lower holding protrusion 223B receives a force F toward the rear. In such a situation, the rear receiving section 253 contacts the lower holding protrusion 223B from the rear.

Other configurations are similar to the configurations of the fourth embodiment. Components of the fifth embodiment the same as the components of the fourth embodiment will be indicated by the reference signs that indicate the components of the fourth embodiment and will not be described.

According to this embodiment, when the electric wire 11 is pulled rearward and the lower holding protrusion 223B slides with the electric wire 11, the force F toward the rear is applied. Therefore, the rear receiving section 253 contacts the lower holding protrusion 223B from the rear and thus displacement of the lower holding protrusion 223B toward the rear is restricted.

Other Embodiments

The present disclosure is not limited to the embodiment described above and illustrated in the drawings. The following embodiments may be included in the technical scope of the technology described herein.

(1) The terminal 12 may include only one holding section or three or more holding sections.

(2) The terminal 12 may be a male terminal that includes a male tab.

(3) The lower holding protrusion 123B in the fourth embodiment protrudes from the left edge 132 of the lower holding section 118B. However, a lower holding protrusion that protrudes from the right edge of the lower holding section may be included in the configurations.

EXPLANATION OF SYMBOLS

10, 60: Terminal wire assembly
11: Electric wire
12, 62: Terminal
13: Core wire
14: Insulating sheath
15, 65, 95, 105, 105A, 205: Terminal body
16: Slider
17: Tubular portion
18A, 68A: Upper holding section
18B, 18C, 68B, 118B, 218B: Lower holding section
20, 80: Wire coupling portion
23A, 73A: Upper holding protrusion (an example of a holding protrusion)
23B, 123B, 223B: Lower holding protrusion (an example of a holding protrusion)
25A: Upper pressing portion
25B: Lower pressing portion
26: Temporary receiving hole
27: Permanent receiving hole
28: Holding protrusion
30, 32, 132: Left edge
31, 33, 133: Right edge
34: Left wall
35: Right wall
40, 140: Metal sheet
45: Jig
46: Jig contact section
47: Drawing section
50A, 50B: Edge
51: Left fragile section
52: Right fragile section
83: Left restricting section (an example of a bending restricting section)
84: Right restricting section (an example of a bending restricting section)
85: Chamfered section
96: First upper fragile section
97: Second upper fragile section
98: First lower fragile section
99: Second lower fragile section
154: Connecting portion
253: Rear receiving section
C: Carrier
P: Cutting position

The invention claimed is:

1. A terminal that is coupled to an end of an electric wire on a front side with respect to an extending direction in which the electric wire extends, the terminal comprising:
- a terminal body being formed from a metal sheet, the terminal body including:
  - at least one holding section holding the electric wire and contacting the electric wire at a first position inside the terminal body, the at least one holding section including a section of the metal sheet; and
  - a holding protrusion protruding inward from the at least one holding section toward the electric wire and contacting the electric wire at a second position spaced from the first position in the extending direction, the holding protrusion including a section of the metal sheet folded on the at least one holding section; and
- a slider fitted on the terminal body to be slidable relative to the terminal body in the extending direction, the slider including a pressing portion opposite the at least one holding section and pressing the at least one holding section toward the electric wire.

2. The terminal according to claim 1, wherein
- the at least one holding section includes holding sections,
- the holding protrusion includes holding protrusions that protrude from the holding sections toward the electric wire, respectively,
- the holding protrusions contact the electric wire,
- the holding protrusions include sections of the metal sheet folded on the respective holding sections, and the holding protrusions are displaced from each other in the extending direction, the electric wire being pressed between one of the holding sections and one of the holding protrusions at the first position, and being pressed between another of the holding sections and another of the holding protrusions at the second position.

3. The terminal according to claim 1, wherein
the section of the metal sheet included in the holding protrusion projects from a side edge of the at least one holding section, and
the side edge of the at least one holding section extends in the extending direction.

4. The terminal according to claim 1, wherein
the section of the metal sheet included in the holding protrusion projects from a side edge of the at least one holding section, and
the side edge of the at least one holding section extends in a direction crossing the extending direction.

5. The terminal according to claim 3, wherein the at least one holding section includes a rear receiving section that protrudes from a rear end of the holding protrusion in the extending direction toward the electric wire.

6. The terminal according to claim 1, wherein
the at least one holding section includes at least one fragile section at one of the side edges of the at least one holding section, and
the at least one holding section has a reduced width at the fragile section.

7. The terminal according to claim 6, wherein
the at least one fragile section includes a first fragile section at a first side edge of the at least one holding section and a second fragile section at a second side edge of the at least one holding section, and
the first fragile section and the second fragile section are displaced from each other in the extending direction.

8. The terminal according to claim 1, wherein
the terminal body includes a bending restricting section opposite the at least one holding section,
the at least one holding section is between the pressing portion and the bending restricting section,
the bending restricting section contacts the at least one holding section to restrict excessive bending of the at least one holding section when the pressing portion presses the at least one holding section.

9. The terminal according to claim 1, wherein
the terminal body includes a sidewall that projects from a side edge of the at least one holding section, and
the sidewall includes a chamfered section that is sloped outward toward a rear in the extending direction.

10. A terminal wire assembly comprising:
the terminal according to claim 1; and
an electric wire coupled to the terminal.

11. A terminal that is coupled to an end of an electric wire on a front side with respect to an extending direction in which the electric wire extends, the terminal comprising:
a terminal body being formed from a metal sheet, the terminal body including:
at least one holding section holding the electric wire inside the terminal body, the at least one holding section including a section of the metal sheet; and
a holding protrusion protruding from the at least one holding section toward the electric wire and contacting the electric wire, the holding protrusion including a section of the metal sheet folded on the at least one holding section; and
a slider fitted on the terminal body to be slidable relative to the terminal body in the extending direction, the slider including a pressing portion opposite the at least one holding section and pressing the at least one holding section toward the electric wire,
wherein
the section of the metal sheet included in the holding protrusion projects from a side edge of the at least one holding section, and
the side edge of the at least one holding section extends in a direction crossing the extending direction.

12. A terminal that is coupled to an end of an electric wire on a front side with respect to an extending direction in which the electric wire extends, the terminal comprising:
a terminal body being formed from a metal sheet, the terminal body including:
at least one holding section holding the electric wire inside the terminal body, the at least one holding section including a section of the metal sheet; and
a holding protrusion protruding from the at least one holding section toward the electric wire and contacting the electric wire, the holding protrusion including a section of the metal sheet folded on the at least one holding section; and
a slider fitted on the terminal body to be slidable relative to the terminal body in the extending direction, the slider including a pressing portion opposite the at least one holding section and pressing the at least one holding section toward the electric wire,
wherein
the terminal body includes a bending restricting section opposite the at least one holding section,
the at least one holding section is between the pressing portion and the bending restricting section,
the bending restricting section contacts the at least one holding section to restrict excessive bending of the at least one holding section when the pressing portion presses the at least one holding section.

* * * * *